March 24, 1959 A. WEINBERGER ET AL 2,879,001

HIGH-SPEED BINARY ADDER HAVING SIMULTANEOUS CARRY GENERATION

Filed Sept. 10, 1956 11 Sheets-Sheet 1

INVENTORS
Arnold Weinberger
BY John L. Smith
Arthur Vinograd ATTORNEY
Leonard F. Stoll AGENT INVENTORS
Arnold Weinberger
John L. Smith BY Arthur Vinograd ATTORNEY
Leonard F. Stoll AGENT INVENTORS
Arnold Weinberger
John L. Smith
BY Arthur Vinograd
Leonard F. Stoll
ATTORNEY
AGENT INVENTORS
Arnold Weinberger
John L. Smith
BY Arthur Vinograd
Leonard F. Stoll
ATTORNEY
AGENT INVENTORS
Arnold Weinberger
John L. Smith
BY Arthur Vinograd
Leonard F. Stoll ATTORNEY AGENT INVENTORS
Arnold Weinberger
John L. Smith
BY Arthur Vinograd ATTORNEY
Leonard F. Stoll AGENT

HIGH-SPEED BINARY ADDER HAVING SIMULTANEOUS CARRY GENERATION

Filed Sept. 10, 1956 11 Sheets-Sheet 7

53-BIT PARALLEL BINARY ADDER

INVENTORS
Arnold Weinberger
John L. Smith

BY Arthur Vinograd
Leonard F. Stoll ATTORNEY AGENT

INVENTORS
Arnold Weinberger
John L. Smith
BY Arthur Vinograd
Leonard F. Stoll
ATTORNEY
AGENT

TABLE I AUXILIARY CARRY FUNCTIONS FOR A 53-BIT BINARY ADDER $$X_9 = F_9 + R_9R_8D_7 + R_9R_8R_7D_6 + R_9R_8R_7R_6D_5 \qquad Y_9 = R_9R_8R_7R_6R_5$$

$$X_{14} = F_{14} + R_{14}R_{13}D_{12} + R_{14}R_{13}R_{12}D_{11} + R_{14}R_{13}R_{12}R_{11}D_{10} \qquad Y_{14} = R_{14}R_{13}R_{12}R_{11}R_{10}$$

$$X_{18} = D_{18} + R_{18}D_{17} + R_{18}R_{17}D_{16} + R_{18}R_{17}R_{16}D_{15} \qquad Y_{18} = R_{18}R_{17}R_{16}R_{15}$$

$$X_{25} = F_{25} + R_{25}R_{24}D_{23} + R_{25}R_{24}R_{23}D_{22} + R_{25}R_{24}R_{23}R_{22}D_{21} \qquad Y_{25} = R_{25}R_{24}R_{23}R_{22}R_{21}$$

$$X_{29} = D_{29} + R_{29}D_{28} + R_{29}R_{28}D_{27} + R_{29}R_{28}R_{27}D_{26} \qquad Y_{29} = R_{29}R_{28}R_{27}R_{26}$$

$$X_{33} = D_{33} + R_{33}D_{32} + R_{33}R_{32}D_{31} + R_{33}R_{32}R_{31}D_{30} \qquad Y_{33} = R_{33}R_{32}R_{31}R_{30}$$

$$X_{38} = F_{38} + R_{38}R_{37}D_{36} + R_{38}R_{37}R_{36}D_{35} + R_{38}R_{37}R_{36}R_{35}D_{34} \qquad Y_{38} = R_{38}R_{37}R_{36}R_{35}R_{34}$$

$$X_{43} = F_{43} + R_{43}R_{42}D_{41} + R_{43}R_{42}R_{41}D_{40} + R_{43}R_{42}R_{41}R_{40}D_{39} \qquad Y_{43} = R_{43}R_{42}R_{41}R_{40}R_{39}$$

$$X_{48} = F_{48} + R_{48}R_{47}D_{46} + R_{48}R_{47}R_{46}D_{45} + R_{48}R_{47}R_{46}R_{45}D_{44} \qquad Y_{48} = R_{48}R_{47}R_{46}R_{45}R_{44}$$

$$Z_{33} = X_{33} + Y_{33}X_{29} + Y_{33}Y_{29}X_{25} \qquad W_{33} = Y_{33}Y_{29}Y_{25}$$

$$Z_{38} = X_{38} + Y_{38}X_{33} + Y_{38}Y_{33}X_{29} + Y_{38}Y_{33}Y_{29}X_{25} \qquad W_{38} = Y_{38}Y_{33}Y_{29}Y_{25}$$

$$Z_{43} = X_{43} + Y_{43}X_{38} + Y_{43}Y_{38}X_{33} + Y_{43}Y_{38}Y_{33}(X_{29}+Y_{29})(X_{29}+X_{25}) \qquad W_{43} = Y_{43}Y_{38}Y_{33}Y_{29}Y_{25}$$

$$Z_{48} = X_{48} + Y_{48}X_{43} + Y_{48}Y_{43}(X_{38}+Y_{38})(X_{38}+X_{33}) + Y_{48}Y_{43}Y_{38}Y_{33}(X_{29}+Y_{29})(X_{29}+X_{25}) \qquad W_{48} = Y_{48}Y_{43}Y_{38}Y_{33}Y_{29}Y_{25}$$

$F_k$ represents $(A_k+B_k)(A_k+A_{k-1})(A_k+B_{k-1})(B_k+A_{k-1})(B_k+B_{k-1})$ $D_k$ represents $A_kB_k$ $R_k$ represents $(A_k+B_k)$

Fig. 11A

INVENTORS
Arnold Weinberger
John L. Smith
BY Arthur Vinograd
ATTORNEY
Leonard F. Stoll
AGENT

TABLE II A
TYPICAL CARRY FUNCTIONS FOR A 53-BIT BINARY ADDER $$C_1 = D_1 + R_1C_0$$
$$C_2 = D_2 + R_2D_1 + R_2R_1C_0$$
$$C_3 = D_3 + R_3D_2 + R_3R_2D_1 + R_3R_2R_1C_0$$
$$C_4 = D_4 + R_4D_3 + R_4R_3D_2 + R_4R_3R_2R_1(A_1+C_0)(B_1+C_0)$$
$$C_5 = D_5 + R_5C_4$$
$$C_6 = D_6 + R_6D_5 + R_6R_5C_4$$
$$C_7 = D_7 + R_7D_6 + R_7R_6D_5 + R_7R_6R_5C_4$$
$$C_8 = F_8 + R_8R_7D_6 + R_8R_7R_6D_5 + R_8R_7R_6R_5C_4$$
$$C_9 = X_9 + Y_9C_4$$
$$C_{10} = D_{10} + R_{10}(X_9+Y_9)(X_9+C_4)$$
$$C_{11} = D_{11} + R_{11}D_{10} + R_{11}R_{10}(X_9+Y_9)(X_9+C_4)$$
$$C_{12} = D_{12} + R_{12}D_{11} + R_{12}R_{11}D_{10} + R_{12}R_{11}R_{10}(X_9+Y_9)(X_9+C_4)$$
$$C_{13} = F_{13} + R_{13}R_{12}D_{11} + R_{13}R_{12}R_{11}D_{10} + R_{13}R_{12}R_{11}R_{10}(X_9+Y_9)(X_9+C_4)$$
$$C_{14} = X_{14} + Y_{14}X_9 + Y_{14}Y_9C_4$$
$$C_{15} = D_{15} + R_{15}X_{14} + R_{15}Y_{14}(X_9+Y_9)(X_9+C_4)$$
$$C_{16} = D_{16} + R_{16}D_{15} + R_{16}R_{15}X_{14} + R_{16}R_{15}Y_{14}(X_9+Y_9)(X_9+C_4)$$
$$C_{17} = F_{17} + R_{17}R_{16}D_{15} + R_{17}R_{16}R_{15}X_{14} + R_{17}R_{16}R_{15}Y_{14}(X_9+Y_9)(X_9+C_4)$$
$$C_{18} = X_{18} + Y_{18}X_{14} + Y_{18}Y_{14}X_9 + Y_{18}Y_{14}Y_9C_4$$
$$C_{19} = D_{19} + R_{19}(X_{18}+Y_{18})(X_{18}+X_{14}) + R_{19}Y_{18}Y_{14}(X_9+Y_9)(X_9+C_4)$$
$$C_{20} = D_{20} + R_{20}D_{19} + R_{20}R_{19}(X_{18}+Y_{18})(X_{18}+X_{14}) + R_{20}R_{19}Y_{18}Y_{14}(X_9+Y_9)(X_9+C_4)$$
$$C_{21} = D_{21} + R_{21}C_{20}$$
$$C_{22} = D_{22} + R_{22}D_{21} + R_{22}R_{21}C_{20}$$
$$C_{23} = D_{23} + R_{23}D_{22} + R_{23}R_{22}D_{21} + R_{23}R_{22}R_{21}C_{20}$$
$$C_{24} = F_{24} + R_{24}R_{23}D_{22} + R_{24}R_{23}R_{22}D_{21} + R_{24}R_{23}R_{22}R_{21}C_{20}$$
$$C_{25} = X_{25} + Y_{25}C_{20}$$
$$C_{26} = D_{26} + R_{26}X_{25} + R_{26}Y_{25}C_{20}$$

$F_k$ represents $(A_k+B_k)(A_k+A_{k-1})(A_k+B_{k-1})(B_k+A_{k-1})(B_k+B_{k-1})$ $D_k$ represents $A_kB_k$ $R_k$ represents $(A_k+B_k)$

Fig. 11B

INVENTORS
Arnold Weinberger
John L. Smith
BY Arthur Vinograd ATTORNEY
Leonard F. Stoll AGENT

TABLE IIB
TYPICAL CARRY FUNCTIONS
FOR A 53-BIT BINARY
ADDER-CONTINUED $$C_{27} = D_{27} + R_{27}D_{26} + R_{27}R_{26}X_{25} + R_{27}R_{26}Y_{25}C_{20}$$

$$C_{28} = F_{28} + R_{28}R_{27}D_{26} + R_{28}R_{27}R_{26}X_{25} + R_{28}R_{27}R_{26}Y_{25}C_{20}$$

$$C_{29} = X_{29} + Y_{29}X_{25} + Y_{29}Y_{25}C_{20}$$

$$C_{30} = D_{30} + R_{30}(X_{29}+Y_{29})(X_{29}+X_{25}) + R_{30}Y_{29}Y_{25}C_{20}$$

$$C_{31} = D_{31} + R_{31}D_{30} + R_{31}R_{30}(X_{29}+Y_{29})(X_{29}+X_{25}) + R_{31}R_{30}Y_{29}Y_{25}C_{20}$$

$$C_{32} = F_{32} + R_{32}R_{31}D_{30} + R_{32}R_{31}R_{30}(X_{29}+Y_{29})(X_{29}+X_{25}) + R_{32}R_{31}R_{30}Y_{29}Y_{25}C_{20}$$

$$C_{33} = Z_{33} + W_{33}C_{20}$$

$$C_{34} = D_{34} + R_{34}(Z_{33}+W_{33})(Z_{33}+C_{20})$$

$$C_{35} = D_{35} + R_{35}D_{34} + R_{35}R_{34}(Z_{33}+W_{33})(Z_{33}+C_{20})$$

$$C_{36} = D_{36} + R_{36}D_{35} + R_{36}R_{35}D_{34} + R_{36}R_{35}R_{34}(Z_{33}+W_{33})(Z_{33}+C_{20})$$

$$C_{37} = F_{37} + R_{37}R_{36}D_{35} + R_{37}R_{36}R_{35}D_{34} + R_{37}R_{36}R_{35}R_{34}(Z_{33}+W_{33})(Z_{33}+C_{20})$$

$$C_{38} = Z_{38} + W_{38}C_{20}$$

$$C_{39} = D_{39} + R_{39}(Z_{38}+W_{38})(Z_{38}+C_{20})$$

$$C_{40} = D_{40} + R_{40}D_{39} + R_{40}R_{39}(Z_{38}+W_{38})(Z_{38}+C_{20})$$

$$C_{41} = D_{41} + R_{41}D_{40} + R_{41}R_{40}D_{39} + R_{41}R_{40}R_{39}(Z_{38}+W_{38})(Z_{38}+C_{20})$$

$$C_{42} = F_{42} + R_{42}R_{41}D_{40} + R_{42}R_{41}R_{40}D_{39} + R_{42}R_{41}R_{40}R_{39}(Z_{38}+W_{38})(Z_{38}+C_{20})$$

$$C_{43} = Z_{43} + W_{43}C_{20}$$

$$C_{44} = D_{44} + R_{44}(Z_{43}+W_{43})(Z_{43}+C_{20})$$

$$C_{45} = D_{45} + R_{45}D_{44} + R_{45}R_{44}(Z_{43}+W_{43})(Z_{43}+C_{20})$$

$$C_{46} = D_{46} + R_{46}D_{45} + R_{46}R_{45}D_{44} + R_{46}R_{45}R_{44}(Z_{43}+W_{43})(Z_{43}+C_{20})$$

$$C_{47} = F_{47} + R_{47}R_{46}D_{45} + R_{47}R_{46}R_{45}D_{44} + R_{47}R_{46}R_{45}R_{44}(Z_{43}+W_{43})(Z_{43}+C_{20})$$

$$C_{48} = Z_{48} + W_{48}C_{20}$$

$$C_{49} = D_{49} + R_{49}(Z_{48}+W_{48})(Z_{48}+C_{20})$$

$$C_{50} = D_{50} + R_{50}D_{49} + R_{50}R_{49}(Z_{48}+W_{48})(Z_{48}+C_{20})$$

$$C_{51} = D_{51} + R_{51}D_{50} + R_{51}R_{50}D_{49} + R_{51}R_{50}R_{49}(Z_{48}+W_{48})(Z_{48}+C_{20})$$

$$C_{52} = F_{52} + R_{52}R_{51}D_{50} + R_{52}R_{51}R_{50}D_{49} + R_{52}R_{51}R_{50}R_{49}(Z_{48}+W_{48})(Z_{48}+C_{20})$$

Fig. 11-C

INVENTORS
Arnold Weinberger
John L. Smith
BY Arthur Vinograd ATTORNEY
Leonard F. Stoll AGENT United States Patent Office 2,879,001

Patented Mar. 24, 1959

2,879,001

HIGH-SPEED BINARY ADDER HAVING SIMULTANEOUS CARRY GENERATION

Arnold Weinberger, Washington, D.C., and John L. Smith, Wheaton, Md., assignors to the United States of America as represented by the Secretary of Commerce Application September 10, 1956, Serial No. 609,048

14 Claims. (Cl. 235—164)

This invention relates to improvements in arithmetic units of the type employed in high-speed digital computers and particularly relates to a novel carry mechanism which enables a digital computer to perform an arithmetic operation such as addition at a speed which is not limited by the necessity of picking up "carries."

In known digital-type computers, the speed at which an arithmetic operation such as addition can be performed is limited not so much by the speed of operation of the half-adder or adder units employed but more by the necessity of sampling the existence of a carry quantity in any lower order addition in order to determine the total in the subsequent higher orders. Manifestly, a summing operation in any higher order cannot be effected until it is known whether a carry quantity has been generated as a result of an addition in any of the lower orders.

It is accordingly an immediate object of this invention to provide in an arithmetic unit, a summation system which permits the simultaneous formation of large groups of carry digits consequent to an adding operation.

It is a further object to this invention to provide a high-speed adder in connection with a digital computer which will produce the sum of multidigit binary numbers within the time limits defined by the cycle period of operation of the computer.

The invention further contemplates an adder mechanism in which a plurality of carry functions can be simultaneously determined independently of each other.

A still further object of this invention is to provide a high-speed adder in which all logical operations can be implemented by standardized gate complexes having a fixed, maximum number of gating circuits.

An additional object of this invention is to provide an adder mechanism in which the number of carry digits which can be simultaneously formed is limited only by the number of and-gates employed for logically combining the carry functions.

Other uses and advantages of the invention will become apparent upon reference to the specification and drawings in which.

Figure 9:
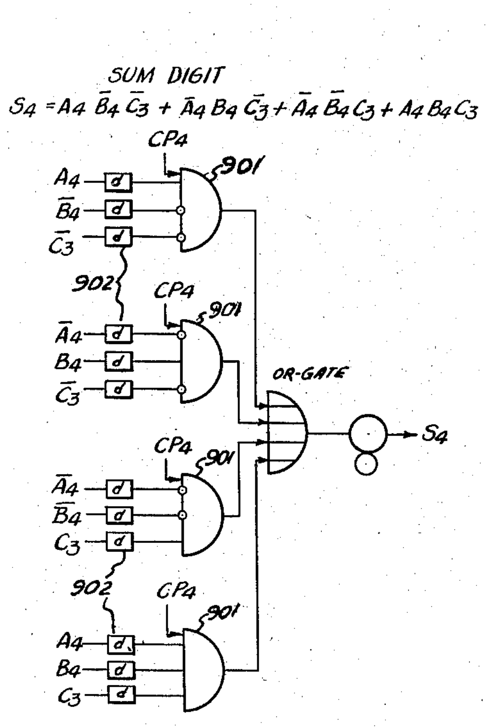
Figure 10:
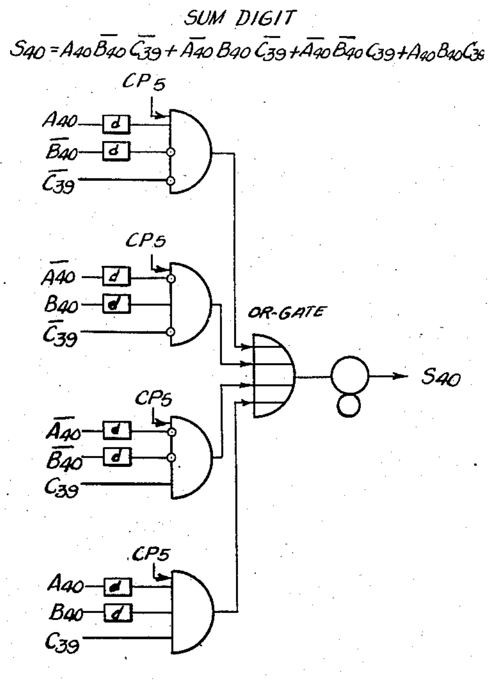
Figure 6:
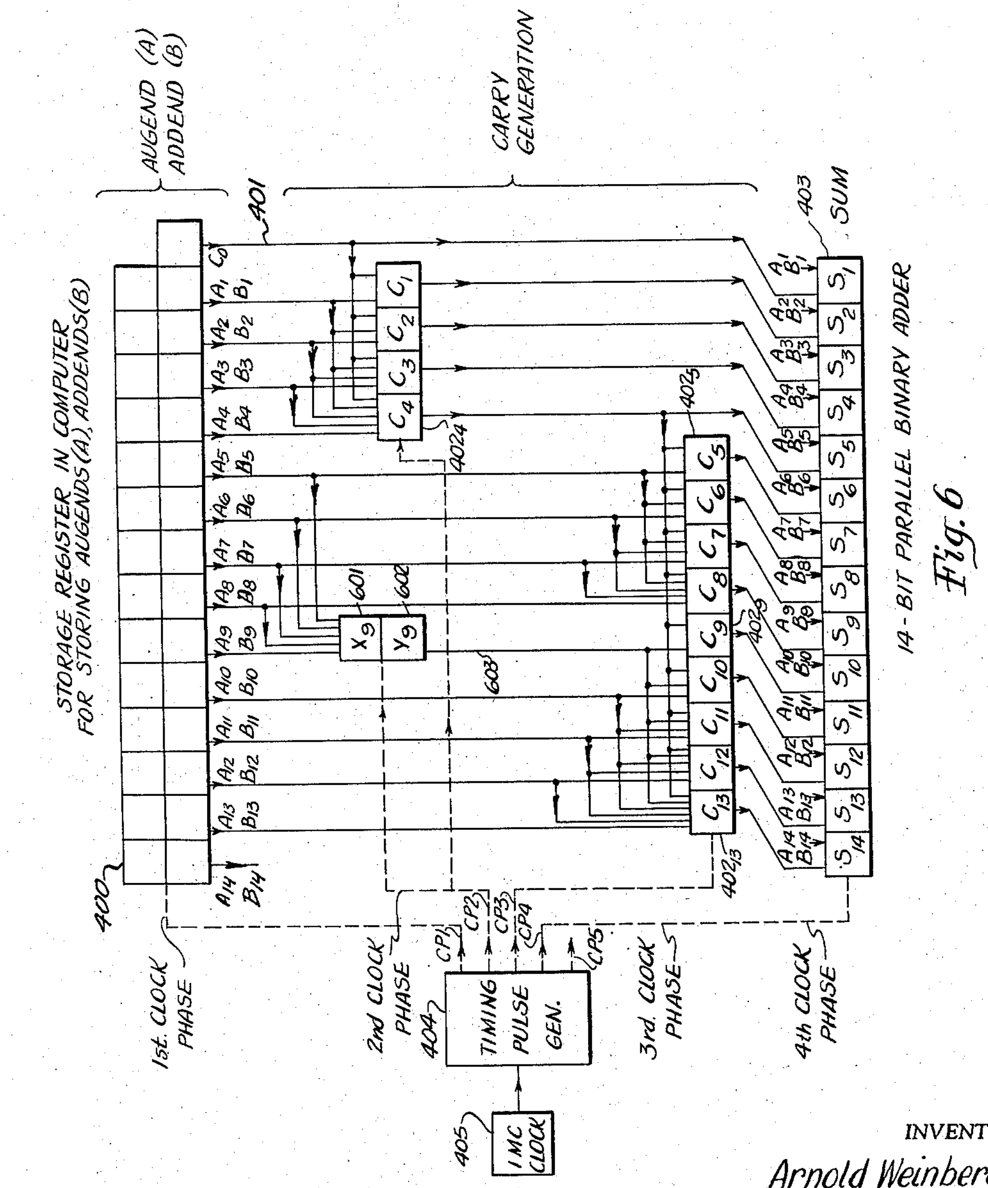
Fig. 6 is a schematic diagram showing an adder mechanism constructed in accordance with the principles of this invention for determining two groups of carry digits during different time periods and means for concurrently determining an auxiliary carry function during one of said periods.
Figure 7:
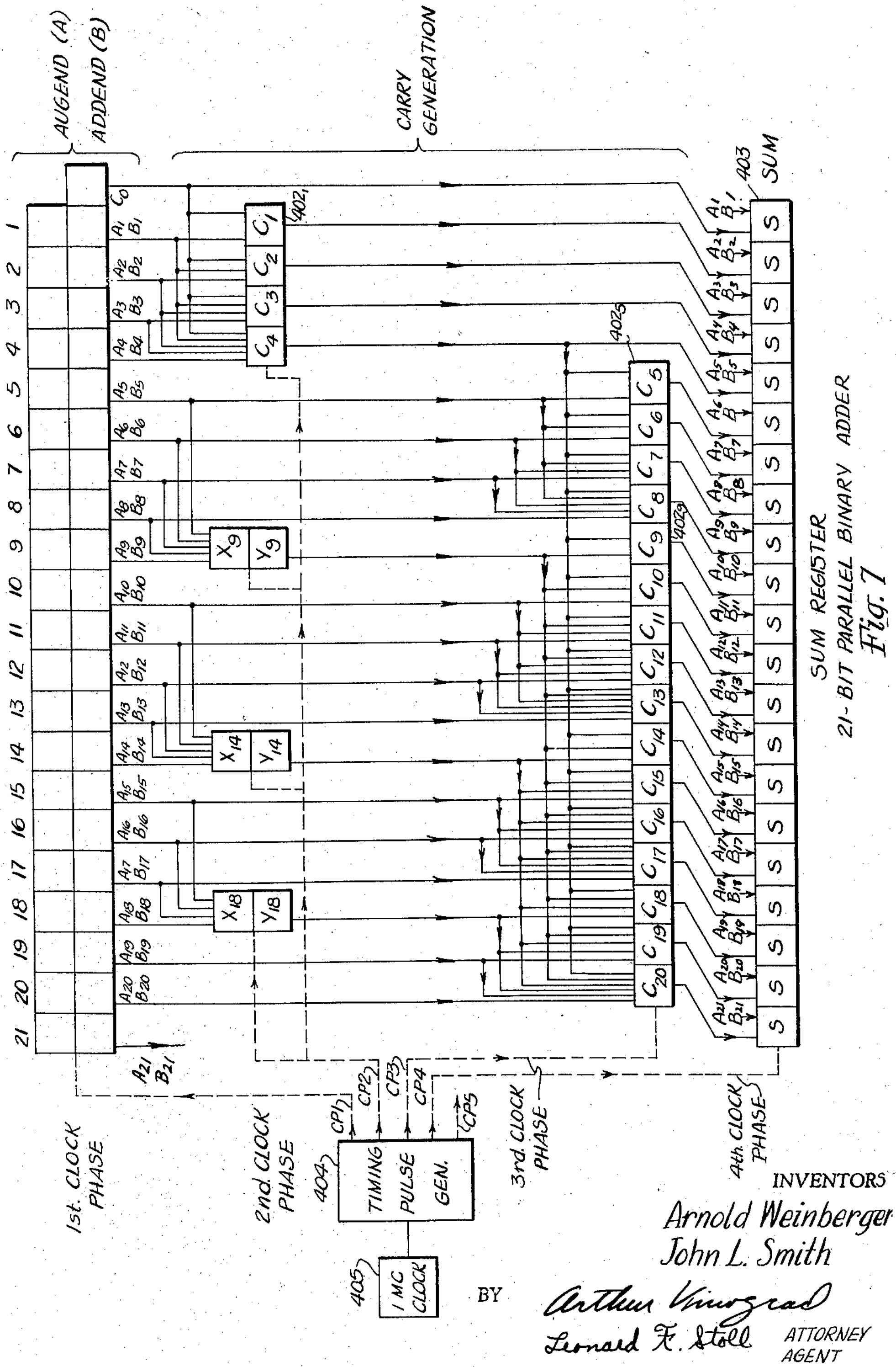
Fig. 7 is a schematic diagram similar to Fig. 6 showing an adder mechanism constructed in accordance with the invention providing for the determination of 20-order carry digits and three auxiliary carry functions.
Figure 8A:
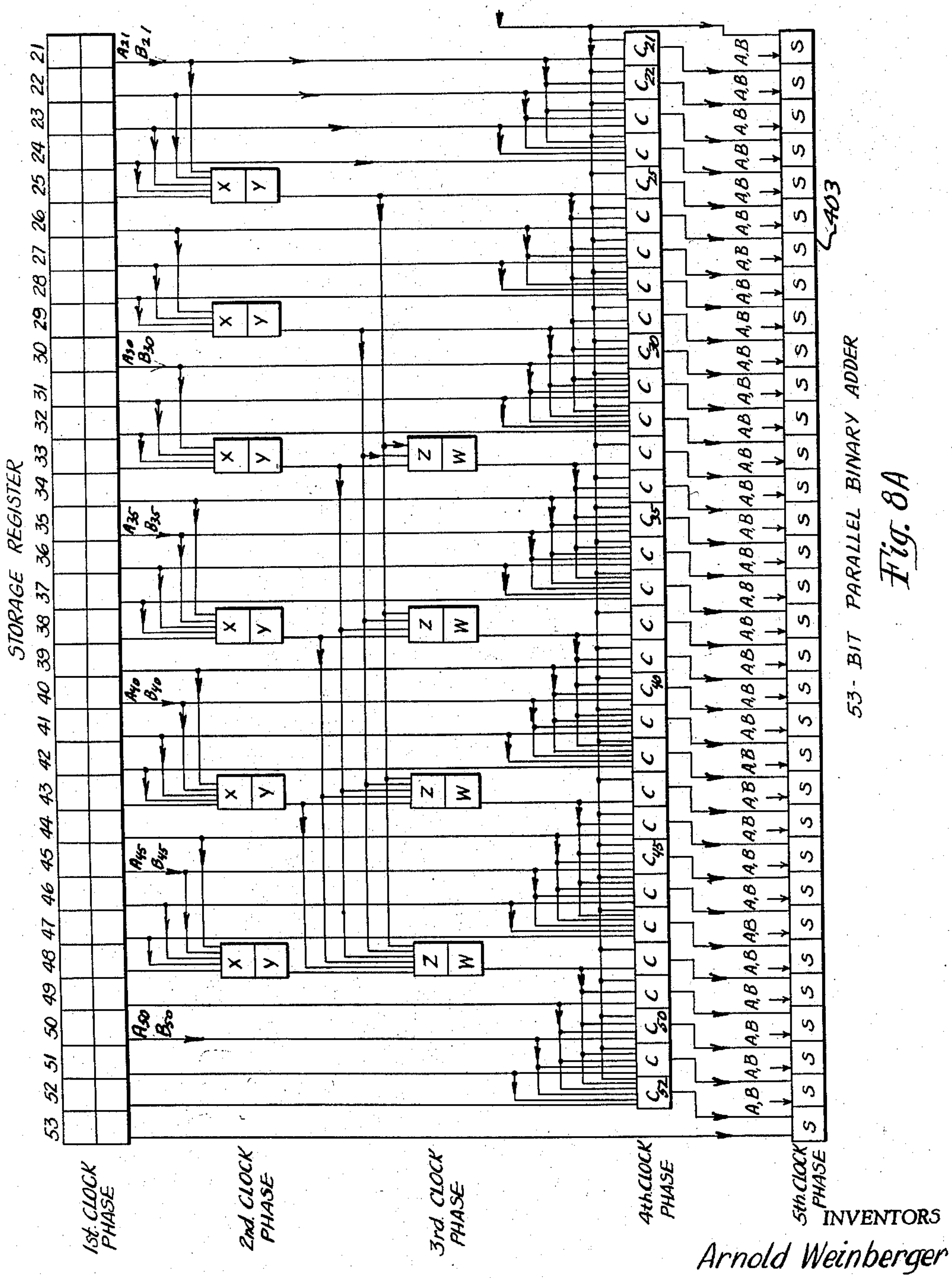
Figure 8B:
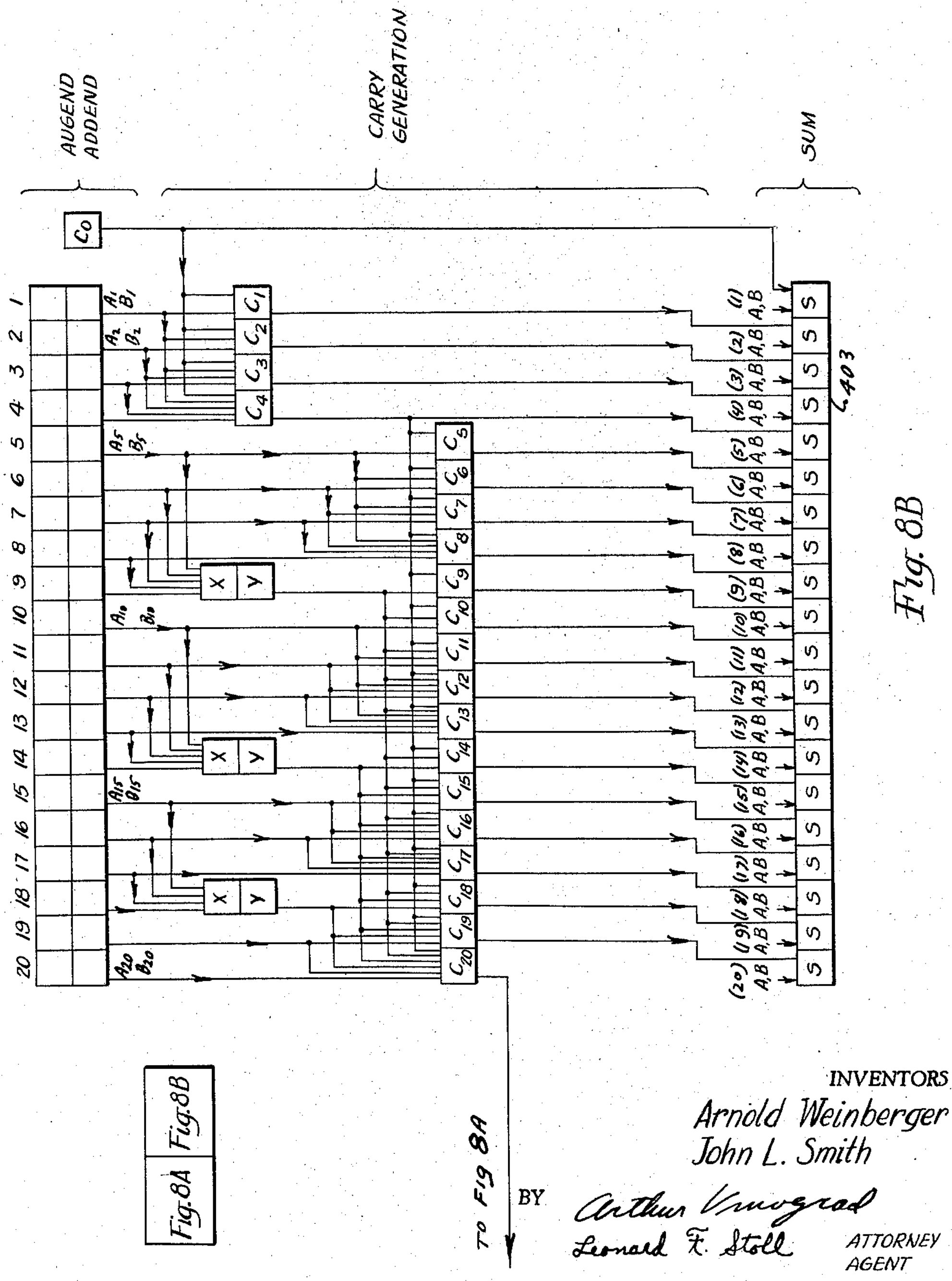

Figs. 8A and 8B which, taken together form a single diagram, is a schematic diagram similar to Figs. 6 and 7 but showing the adder mechanism according to this invention adapted for summing two 53-digit binary numbers and showing the mechanism employed for obtaining both first-and-second-level auxiliary carry functions;

Figs. 9 and 10 are logical circuit diagrams illustrating typical summation mechanism employed in the present invention; and Figs. 11A, 11B, and 11C contain Tables I and II, respectively listing various carry functions employed in connection with this invention.

In accordance with the principles of this invention, the logical equations representing the carry digits consequent to a binary addition, by factorization, are modified into a mathematical form on which a gating complex can be based, and are embodied as a parallel adder which is capable of adding for example two 53-binary-digit numbers within a one mergacycle clock-cycle period characterizing a particular type of digital computer.

The features characterizing the present invention can best be understood by considering briefly certain practical limitations occasioned by engineering design considerations necessary in the fabrication of a large-scale digital computer. A typical example of the over-all computer with which the present invention is particularly concerned is the National Bureau of Standards' SEAC (Standards Eastern Automatic Computer) or improved DYSEAC (Second Standards Eastern Automatic Computer). A general description of the SEAC is contained in an article by Greenwald, Haeuter and Alexander in Proc. IRE, vol. 41, pp. 1300–1313, October 1953 while the DYSEAC is described in an article by Leiner and Alexander published in Trans. IRE-PGEC, vol. EC3, No. 2, June 1954. It is therefore considered unnecessary to describe in any great detail the construction of these machines and only sufficient background information as is necessary to emphasize the purpose and operation of the present invention will therefore be alluded to in the present description.

Briefly, in machines such as the DYSEAC use is made of packaged components having circuitry of predetermined design. The design of each component is such as to permit considerable flexibility in the design-arrangement of the over-all computer due to the fact that the circuitry which interconnects the various components can optionally integrate different ones of the subcomponents into various desired combinations and configurations as fully described in copending application Serial No. 375,846 of August 21, 1953, by Richard P. Witt and assigned to the assignee of the present invention.

Figures 1, 5:
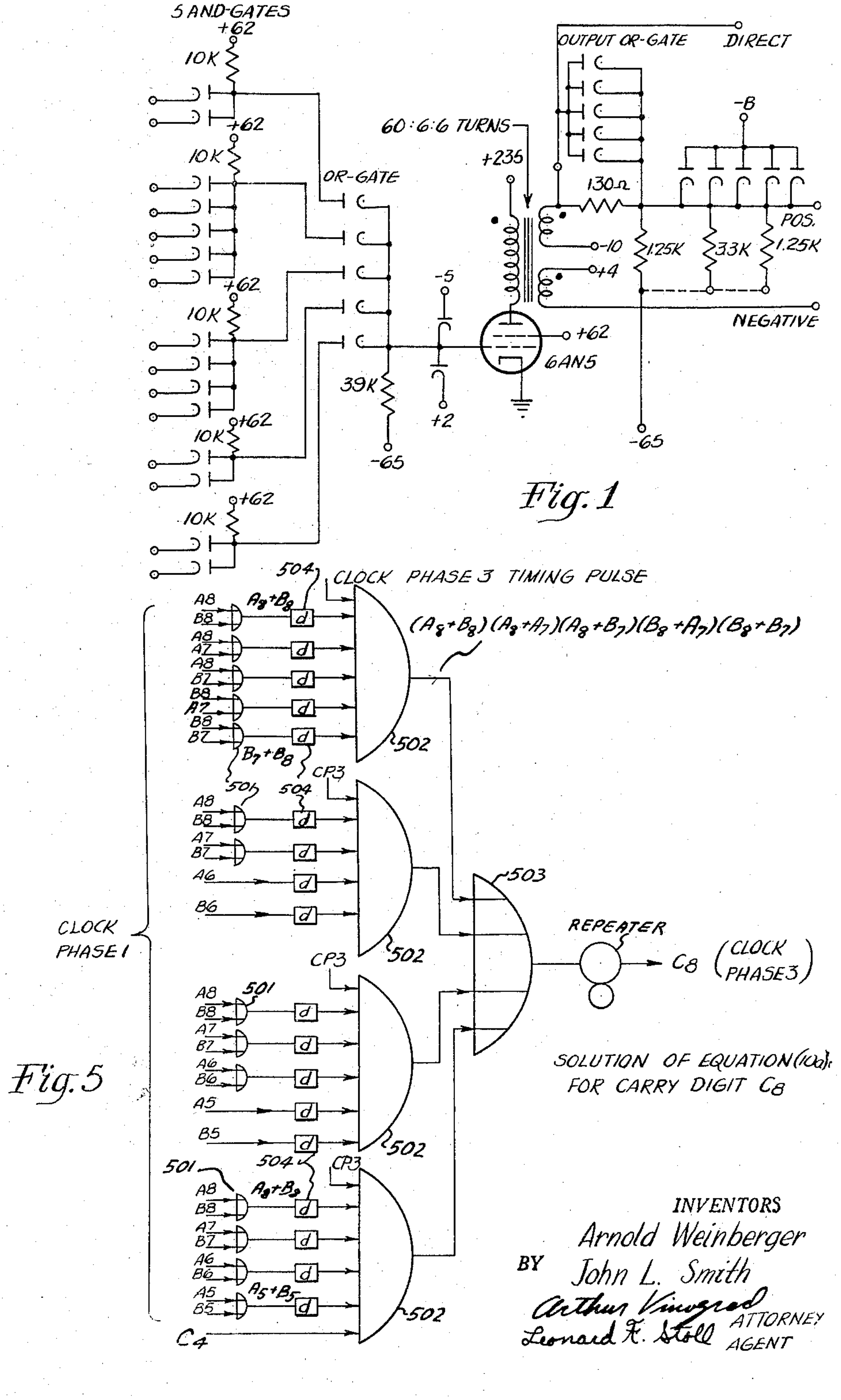
Fig. 1 is a circuit diagram of a sandard SEAC type or-and-or-gate complex employed as a logical component in the present invention.
Fig. 5 is a schematic diagram illustrating the manner in which the circuit components according to this invention are logically arranged to determine an eighth-order carry digit.
Figures 2, 2A, 2B, 2C, 2D, 2E, 2F, 2G, 2H, 2I, 2J:
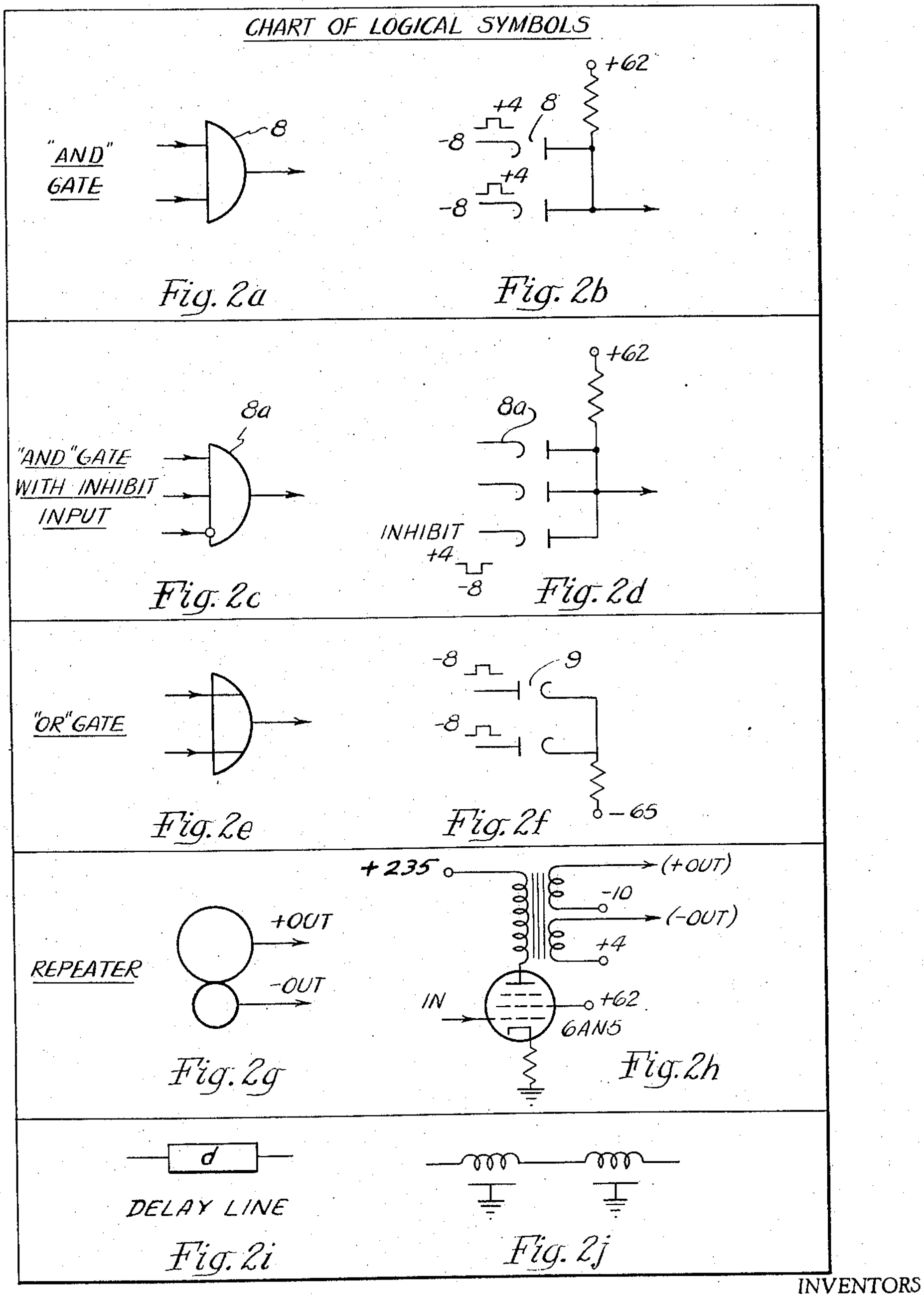
Fig. 2 is a chart indicating the circuit construction of the various circuit components employed in the invention together with diagrammatic symbols representing the various components.

As described in such application and also in an article entitled "Dynamic Circuit Techniques Used in SEAC and DYSEAC" by Elbourn and Witt, Proc. IRE, vol. 41, No. 10, October 1953, pages 1380–1387 a gating complex component package may consist of a predetermined number of and-gates each having a predetermined number of inputs. The package also includes a sufficient number of or-gates to provide for combining inputs to the and-gates, and a repeater or amplifier tube. A circuit diagram detailing a typical such gating computer is shown in Fig. 1. Five and-gates are optionally provided as indicated. It will be understood that each input to the and-gates may be in the form of an or-gate as is conventional. In order to illustrate the logical operations involved as the description proceeds, conventional symbolization will be employed to designate the various components of each gate complex. Specifically, Fig. 2 is a chart showing the symbols for the corresponding circuit components employed in each gate complex in the present invention. Figs. 2A–2B represent an and-gate, Figs. 2C–2D show an and-inhibit-gate, Figs. 2E–2F are for an or-gate. Figs. 2G–2H explain a repeater stage and Figs. 2I–2J demonstrate a delay line.

The present invention particularly contemplates a carry mechanism designed to function within the limitations established by and consequent to the employment of the referred-to packaged component type of circuitry. It will be demonstrated, as the description proceeds, that all the mathematical relationships defining the addition of the two multidigit binary numbers can be expressed in a form tailored to fit a mechanism in which each adder component need include no more than four and-gates each having a maximum of six inputs (as represented by corresponding or-gates). That is, an analysis of the functional representation of the carry digits in an addition process will show that the one-megacycle circuitry of a computer such as the SEAC or DYSEAC can be organized logically to permit the simultaneous formation of many successive carries.

The Boolean algebraic expression for any carry digit $C_k$ can be expanded so as to be an explicit function of only the input digits ($A_k$, $B_k$) of any order ($k$) and of the carry digit from the next lower order $C_{k-1}$. It will be shown that as a result of certain factorizations, these expressions can be simplified so that all of them fall within the gating-complexity limitations imposed by the circuitry of the computer with which the invention is employed. Such principles are then implemented as a parallel adder capable of adding, by way of example, two 53-bit numbers in a one-microsecond interval, employing relatively few additional components as compared to a parallel adder of more conventional design.

As described in the above-identified article by Elbourn and Witt, the clock or timing pulse which determines the over-all timing of the computer is applied as an input to one or more of the and-gates and the rate at which successive pulses pass through a component stage is therefore determined by the clock frequency which, by way of example, may be one megacycle per second. Since the actual transit time of a pulse through a stage is considerably less than one microsecond, for increasing the flexibilty of operation, the clock pulses are made available in several phases (time periods within the one-microsecond period) and different stages may be controlled by clock pulses of different phases. In the DYSEAC, for example, four-phase clock pulses are used, while in the adder of the present invention a five-phase clock is employed.

The principles of arithmetic addition based on Boolean algebraic representations are fully explained on pages 26–50 and 81–135 of "Arithmetic Operations in Digital Computers" by R. K. Richards, published by D. Van Nostrand. In accordance with such principles, it can be shown that the sum $S_k$ of an augend $A_k$ and addend $B_k$ in any order can be expressed as $$S_k=\bar{A}_k\bar{B}_kC_{k-1}+\bar{A}_kB_k\bar{C}_{k-1}+A_k\bar{B}_k\bar{C}_{k-1}+A_kB_kC_{k-1} \quad (1)$$

where $S_k$ is the sum and $C_{k-1}$ is the carry from the next lower order. The carry ($C_k$) generated in any order can similarly be expressed by $$C_k=\bar{A}_kB_kC_{k-1}+A_k\bar{B}_kC_{k-1}+A_kB_k\bar{C}_{k-1}+A_kB_kC_{k-1} \quad (2a)$$

By factoring in accordance with the rules of Boolean algebra it can be shown that $$C_k=A_kB_k+A_kC_{k-1}+B_kC_{k-1} \quad (2b)$$

$$C_k=(A_k+B_k)(A_k+C_{k-1})(B_k+C_{k-1}) \quad (2c)$$

$$C_k=A_kB_k+(A_k+B_k)C_{k-1} \quad (2d)$$

As the above operations indicate, the functional expression for the carry $C_k$ in any order can be reduced from four terms of three factors each (which would require four and-gates each having three inputs) as shown by Equation 2*a* to three alternative forms each involving fewer terms and factors (Equations 2*b*–2*d*).

Equation 1 above, for the sum $S_k$ indicates that only four and-gates are necessary for such operation and the previously noted design limitations accordingly permit implementing of such operations in one gating stage. Therefore, any sum digit can be made available during the clock phase which immediately follows the formation of its corresponding carry, $C_{k-1}$. Equations 2*a*–2*d* however, indicate that the carry $C_k$ formulated during an addition in any order is dependent in part on the carry $C_{k-1}$ generated by an addition in the next lower order. That is, if the carries are generated in accordance with Equations 2*a*–2*d*, the carry digit for any order could not be determined until the formation of the next lower order carry $C_{k-1}$. Because of such relationship, the carry digits $C_k$ can be obtained at the rate of one per clock phase, and the generation of a number of sum digits $S_1$, $S_2$, $S_3$, etc. corresponding to the various orders in a number would require a like number of clock phases. For numbers having n-binary digits, there would be $n-1$ possible carries, requiring $n-1$ clock phases for their complete determination.

The limitations apparently imposed on the generation of carries by the sequential method are overcome in accordance with the principles of the present invention. Such limitations are apparent from Equations 2*a*–2*d* which specify the carry, $C_k$, as an explicit function of the previous order carry $C_{k-1}$. It will be demonstrated that $C_k$ need not depend explicitly on $C_{k-1}$, but can be expressed as a function of $C_0$ (neglecting for purposes of discussion the augends and addends pertinent to the order under consideration).

$C_0$ is defined as equivalent to a carry which, together with the least significant augend and addend digits $A_1B_1$, forms the least significant sum digit $S_1$. Thus:

$$S_1=\bar{A}_1\bar{B}_1C_0+\bar{A}_1B_1\bar{C}_0+A_1\bar{B}_1\bar{C}_0+A_1B_1C_0 \quad (3)$$

$C_0$ in other words is analogous to a "1" added to the least significant position of a word and is used in "2's" complementing in which all bits are inverted and a "1" is added to the least significant digit. Such carry function $C_0$ is employed during addition cycles requiring the adding of a 1 to the sum, such as the adding of negative numbers in complementary form. That the carry $C_k$ in any order need not depend explicitly on the preceding order carry can be demonstrated as follows.

From a consideration of Equation 2*d* which can be in the form:

$$C_k=A_kB_k+(A_k+B_k)C_{k-1} \quad (2d)$$

it may be stated that the carry digit $C_k$ in any order ($k$) is a function of $C_{k-1}$, the carry digit of the preceding order. Similarly by analogy, the carry digit for any preceding order, for example $C_{k-1}$ is a function of $C_{k-2}$. Therefore $C_k$ in turn can readily be expressed as a function of $C_{k-2}$. In this manner it will be apparent that $C_k$ can be further expanded until it is a function of $C_{k-3}$, then $C_{k-4}$, etc. The limit to such expansion is determined only by the permissible gating complexity of the circuit employed as above mentioned.

Equation 2*d* in other words can readily be expanded so that the carry digit $C_k$ in any order will be independent of a number of previous order carries.

Accordingly, it can now be demonstrated how each additional order of expansion adds only one term to the expression for $C_k$ and only one factor to the largest of the terms defining the carry digit concerned.

For a second order addition, the carry $C_k$ is defined by Equation 2*d*:

$$\begin{aligned}C_k=&A_kB_k\\&+(A_k+B_k)C_{k-1}\end{aligned}\qquad(2d)$$

where $k-1$ corresponds to the least significant order.

For an additional higher order, the carry $C_k$ is defined by:

$$\begin{aligned}C_k=&A_kB_k\\&+(A_k+B_k)A_{k-1}B_{k-1}\\&+(A_k+B_k)(A_{k-1}+B_{k-1})C_{k-2}\end{aligned}\qquad(2e)$$

where $k-2$ corresponds to the least significant order. It will be noted that $C_k$ is a function of $C_{k-2}$ and is independent of $C_{k-1}$.

For a still higher order the carry $C_k$ becomes:

$$\begin{aligned}C_k=&A_kB_k\\&+(A_k+B_k)A_{k-1}B_{k-1}\\&+(A_k+B_k)(A_{k-1}+B_{k-1})A_{k-2}B_{k-2}\\&+(A_k+B_k)(A_{k-1}+B_{k-1})(A_{k-2}+B_{k-2})C_{k-3}\end{aligned}\qquad(2f)$$

where $k-3$ corresponds to the least significant order and so on. It will be noted that $C_k$ becomes a function of $C_{k-3}$ and is independent of both $C_{k-1}$ and $C_{k-2}$.

The above exemplary expansions clearly indicate that aside from the particular augends and addends, the carry digit $C_k$ in any order need depend only upon a single previous carry function such as either $C_{k-1}$, $C_{k-2}$, or $C_{k-3}$ etc., depending on the particular order concerned, and is independent of the intermediate carry functions.

The above analysis can be used to determine the number of successive carries that can be generated simultaneously.

Figure 3A:
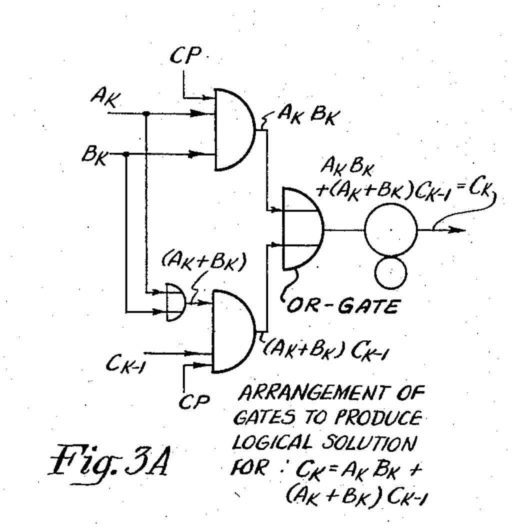
Fig. 3A is a schematic diagram illustrating the manner in which the circuit components are logically arranged to determine a carry function in accordance with the present invention.

Fig. 3A shows a typical gating stage representing the referred-to packaged circuit component characterizing DYSEAC construction, together with the Boolean algebraic notation for the various inputs and outputs representing Equation 2*d* for the general case of a carry in any order. That is, $$\begin{aligned}C_k=&A_kB_k\\&+(A_k+B_k)C_{k-1}\end{aligned}\qquad(2d)$$

In accordance with such equation the carry $C_k$ is a function of the augend ($A_k$) and the addend ($B_k$) (whenever both are 1's) plus the carry from the preceding $k-1$ stage ($C_{k-1}$) depending on whether $A_k$ or $B_k$ is a 1. Since the or-gates in Fig. 3A provide a summation and the and-gates a logical product of the applied inputs, the output obtained from or-gate will correspond to Equation 2*d* as will be obvious by following through the logical circuitry illustrated in Fig. 3A.

The generalized condition stated by Equations 2*d*–2*f* can be applied to each order of a multidigit number to define the carry digit generated in each order as follows. For the first order, the carry $C_1$ is expressed by $$\begin{aligned}C_1=&A_1B_1\\&+(A_1+B_1)C_0\end{aligned}\qquad(3)$$

where $A_1$ is the augend and $B_1$ the addend of the first-order digits and $C_0$ represents the previously-defined carry. Manifestly, two and-gates are required to implement Equation 3 namely, to obtain the logical product $A_1B_1$ and the logical product $(A_1+B_1)C_0$, respectively.

For the second order, the carry $C_2$ is expressed by:

$$\begin{aligned}C_2=&A_2B_2\\&+(A_2+B_2)C_1\end{aligned}\qquad(4a)$$

where $A_2$ and $B_2$ represent the augend and addend of the second order of a number and $C_1$ the carry from the preceding order.

Since $C_1$ has been defined in Equation 3 above as a function of $A_1$, $B_1$, and $C_0$ then by substitution, $C_2$ can be expressed independently of the preceding order carry $C_1$ as a function of $C_0$.

$$\begin{aligned}C_2=&A_2B_2\\&+(A_2+B_2)A_1B_1\\&+(A_2+B_2)(A_1+B_1)C_0\end{aligned}\qquad(4b)$$

In this case 3 and-gates are required to handle the product expressed in each line of the equation.

For the third order, the carry $C_3$ can be similarly expressed independently of the preceding order carries $C_1$ and $C_2$ as a function of $C_0$ as follows:

$$\begin{aligned}C_3=&A_3B_3\\&+(A_3+B_3)C_2\end{aligned}\qquad(5a)\qquad\begin{aligned}&=A_3B_3\\&+(A_3+B_3)A_2B_2\\&+(\qquad)(A_2+B_2)A_1B_1\\&+(\qquad)(\qquad)(A_1+B_1)C_0\end{aligned}\qquad(5b)$$

In the above and subsequent development, the parenthetically indicated quantities are identical with the expression immediately above them. Similarly, for the fourth order.

$$\begin{aligned}C_4=&A_4B_4\\&+(A_4+B_4)C_3\end{aligned}\qquad(6a)\qquad\begin{aligned}&=A_4B_4\\&+(A_4+B_4)A_3B_3\\&+(\qquad)(A_3+B_3)A_2B_2\\&+(\qquad)(\qquad)(A_2+B_2)A_1B_1\\&+(\qquad)(\qquad)(\qquad)(A_1+B_1)C_0\end{aligned}\qquad(6b)$$

The fourth order carry $C_4$ is thus expressed as a function of $C_0$ and independent of the intermediate carry functions $C_1$, $C_2$, $C_3$.

At this point it will be noted that Equation 6*b* requires 5 and-gates which would exceed the capacity of the optionally chosen packaged type of circuitry of Fig. 1. However, the last two terms can be combined into one term by employing the following transformation:

$$A_1B_1+(A_1+B_1)C_0=(A_1+B_1)(A_1+C_0)(B_1+C_0)$$

and equation 6*b* can be written as:

$$\begin{aligned}C_4=&A_4B_4\\&+(A_4+B_4)(A_3B_3)\\&+(\qquad)(A_3+B_3)(A_2B_2)\\&+\qquad)(\qquad)(A_2+B_2)(A_1+B_1)(A_1+C_0)(B_1+C_0)\end{aligned}\qquad(6c)$$

Since only 4 logical multiplications are involved in such form of the equation for $C_4$, only 4 and-gates are required and the referred-to packaged circuit component (Fig. 1) can be used.

In this manner, considering each order in turn, the logical operation as above represented indicate that the carry function in each order can be implemented by a maximum of 4 and-gates.

It will be understood that the limitation imposed by the number of gates employed is dictated by design considerations involved in the computer and is not occasioned by structural features inherent in the present invention. Capacitive and other effects consequent to the use of diodes in the gating circuits limit the number of gates in each component to a degree necessary to preserve the wave form of the signals and the necessity of reducing the equations to equivalent forms involving no more than 4 logical product functions should not be interpreted as a limiting feature of the invention.

The described maximum number of (4) and-gates employed to implement the carry mechanism is one less than the 5 and-gates available in the gate complex component described in connection with Fig. 1. The fifth gate is reserved for regeneration of the output pulses in order to standardize their wave forms and their timing by means of clock pulses as will be readily understood by those skilled in the art.

It will be observed from Equations 3, 4*b*, 5*b*, and 6*c* that all carry functions up to the fourth order can be expressed as a function of $C_0$ without regard to the intermediate $C_1$, $C_2$, $C_3$ order carries and that a maximum of 4 and-gates will enable the determination of the carry function in any of those orders. It will be clear then that a considerable gain in speed can thereby be obtained by expanding $C_k$ until the maximum permissible gating complexity within the limits determined by the components used is reached. In this manner it can be shown that as many as four successive carries can be simultaneously formed in one clock phase while only one gating complex or stage per carry is required.

The simultaneous system of carry generation characterizing the present invention will be explained in the ensuing portion of the specification by considering in sequence a lower-order form of the mechanism (Fig. 4), then a higher order such as is represented in Fig. 6, a still higher form of carry generation as exemplified in Fig. 7 and finally a system employing two levels of auxiliary carry functions capable of handling 53-digit binary numbers as detailed in Figs. 8A–8B.

Figure 4:
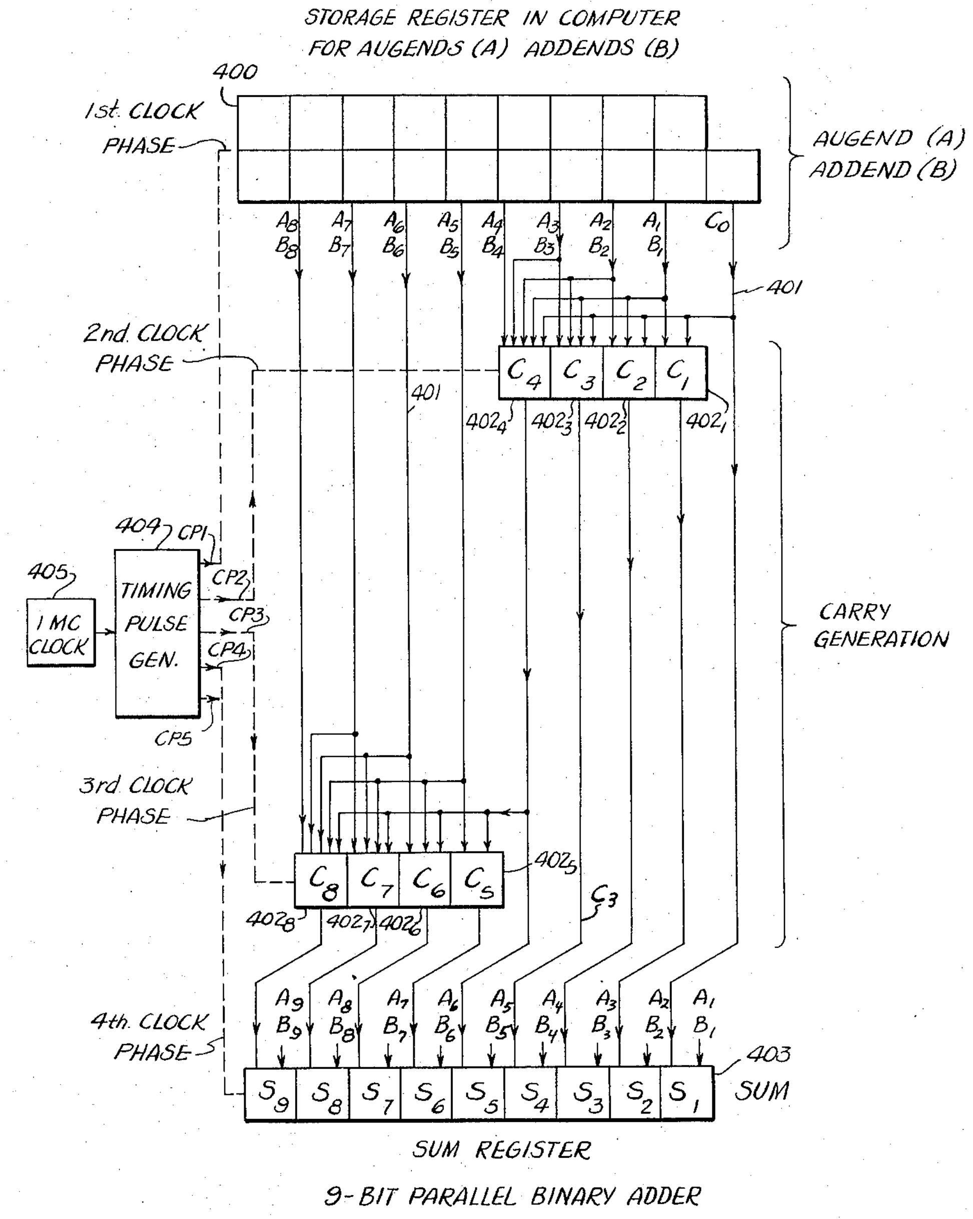
Fig. 4 is a schematic block diagram showing an adder mechanism constructed in accordance with the principles of this invention for determining two groups of carry digits during different time periods.

Some of the basic principles for implementing the above-described operations for carry determination will become apparent by considering first the summing apparatus schematically shown in block diagram form in Fig. 4. Fig. 4 shows the logical circuit arrangement for the 9 least significant digits of a parallel adder mechanism in accordance with the present invention. For the present, only the first 4 orders of operands $A_1$, $A_2$, $A_3$, $A_4$ will be discussed. The augends and addends of the first 5 orders are represented by A and B respectively with subscripts corresponding to the respective orders. The augends and addends are made available in parallel from a suitable source in the computer such as the storage register 400 indicated in Fig. 4. Such mechanism is conventional in connection with high-speed computers and may consist of a number of stages of bistable elements in which the state or condition of conduction in each stage represents a binary digit. When initiated by a clock pulse of a first-clock phase, the augends $A_1 \ldots$ and the addends $B_1 \ldots$ are manifested on output leads 401. Only one lead is indicated for each stage of the register for purposes of clarity. It will be understood that each such lead represents a plurality of conductors, one for each operand. The carries $C_1$—$C_4$ generated in each order consequent to the summation are considered during the second clock phase as indicated in Fig. 4.

The timing pulses for determining the sequence of carry generation are obtained from a timing pulse generator 404 driven by a clock pulse generator 405 both components forming part of the computer mechanism as described in the above-identified article by Greenwald et al. Timing pulses of different phase $CP_1$, $CP_2$, $CP_3$, $CP_4$, and $CP_5$ are obtained as outputs from timing pulse generator 404 during each one-megacycle clock cycle defined by the clock pulse generator 405, and are applied as indicated. The fifth clock-phase timing pulse $CP_5$ is employed with the higher order carries system to be described and need not be considered in connection with the description of Fig. 4. At this point in the description the conventional manner in which synchronization of the signals which occur during each clock phase is achieved will be briefly described.

Figure 3B:
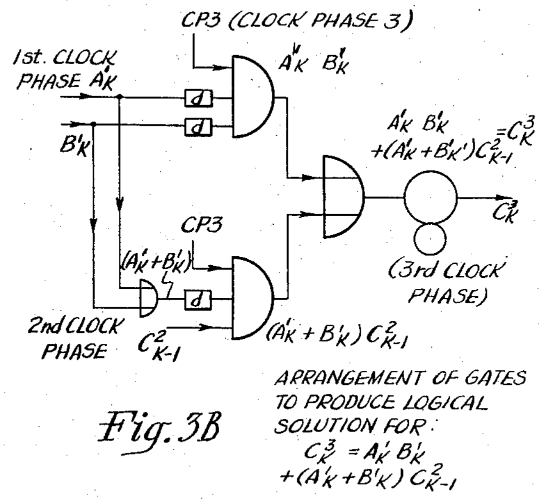
Fig. 3B is a schematic diagram similar to Fig. 3A illustrating the logical arrangement of circuit elements to determine a carry function involving operands and previous order carries occurring during different time periods within a cycle.

Fig. 3B shows the same logical circuit shown in Fig. 3A for solving an equation of the type $$C_k = A_kB_k + (A_k + B_k)C_{k-1}$$

but modified for a case in which the various input signals to the gates are generated during different clock phases. That is, Fig. 3A shows the basic logical circuit for a condition in which it is assumed that all signals originate concurrently. In accordance with the system portrayed in Fig. 4 however, signals corresponding to the functions $C_1$, $C_2$, $C_3$, $C_4$ occur during a second clock phase ($CP_2$), the operands are made available during a first-clock phase ($CP_1$), the carry functions $C_5$, $C_6$, $C_7$, $C_8$ are generated during a third-clock phase ($CP_3$), while the sum digits $S_1$ etc. are formulated during a fourth clock phase $CP_4$. It will be apparent therefore that under such system, synchronization of signals must be provided for.

Fig. 3B generally illustrates the means employed in the present invention for achieving synchronization of signals. The circuit shown in Fig. 3B is for the solution of an equation of the type described in connection with Fig. 3A but for a situation in which:

(*a*) The carry function $C_k$ is generated in a third-clock phase (designated by $C_k^3$);

(*b*) The operands A and B are made available during a first-clock phase and are designated as $A_k^1$, $B_k^1$;

(*c*) The previous order carry $C_{k-1}$ is generated in an intermediate or second clock phase and is designated as $C_{k-1}^2$.

Thus $$C_k^3 = A_k^1B_k^1 + (A_k^1 + B_k^1)C_{k-1}^2 \qquad (2e)$$

in which the superscripts designate the particular clock phase corresponding to the digit under consideration. Under the system of nomenclature employed in the present case, a carry signal $C_k$ is designated with a superscript corresponding to the clock-pulse phase associated with the stage generating the carry signal $C_k$. Thus the carry signal $C_{k-1}^2$ is generated in a stage energized by a clock pulse of a second phase.

The gating complex shown in Fig. 3B accomplishes the combining of terms in the same manner described in connection with Fig. 3A except that the three delay elements indicated in Fig. 3B compensate for the time period between the various clock phases. That is, since the operands $A_k^1$ and $B_k^1$ occur during a first-clock phase and the clock pulse applied to the upper and-gate occurs during a third-clock phase, assuming a five-phase, one-megacycle clock pulse, then a delay unit must be provided for both the $A_k^1$ and $B_k^1$ signals each having a $\frac{1}{5}$ μs delay. Similarly the $(A_k^1+B_k^1)$ input to the lower and-gate must have a $\frac{1}{5}$ μs delay to synchronize with $CP_3$.

Again referring to Fig. 4, the carries, $C_1$, $C_2$, $C_3$ are generated in each of the first four orders by combining the operands of each order during the second clock phase $CP_2$ as indicated. Each of the $C_1$, $C_2$, $C_3$, $C_4$ carry mechanisms designated by $402_1$–$402_4$ are gate complexes having the same logical arrangement generally indicated in Figs. 3A and 3B and comprising the specific circuitry described in connection with Figs. 1 and 2. Since Figs. 3A and 3B and the related descriptions clearly show the manner of arranging the gating circuits to obtain the solution of the generalized expressions for $C_k$ (i. e. Equations 2*d*, 2*e*, and 2*f*), the manner of selecting and arranging the gating components for obtaining a solution of Equations 3, 4*b*, 5*b* and 6*b* which define the respective carry digits $C_1$, $C_2$, $C_3$, and $C_4$ will be readily apparent without detailing the construction of each carry mechanism.

In order to enable the invention to be understood, a typical example of the carry gate complex employed for the solution of a more complex carry such as $C_8$ is illustrated in Fig. 5 and will be further described following the development of the equations for the next four-order carries $C_5$, $C_6$, $C_7$, $C_8$.

A typical stage for obtaining the sum digit such as $S_1$ etc., is illustrated in Fig. 9 and will be specifically described in a subsequent portion of the specification.

During the fourth-clock phase, the augends and addends of each order together with the carries $C_1$, $C_2$, $C_3$, $C_4$ generated during the second-clock phase are summed to provide the sums $S_1$, $S_2$, $S_3$, $S_4$, $S_5$ which are manifested in the register 403 of conventional type. It will be noted that the least significant sum digit, $S_1$ could actually be obtained during the second-clock phase according to Equation 3 because it is a function of $A_1$, $B_1$, and $C_0$, all three of which are available during the first-clock phase. However, it is desirable in the parallel adder according to the present invention to obtain all of the sum digits (S) at the same time. Consequently, $S_1$ is deliberately delayed to occur at the same clock phase as the other sum digits.

It will be apparent from the description so far presented, that while the carry digit, $C_k$, for any order cannot be made independent of all of the preceding carries, it can be made independent of a considerable number of them, the number being determined by the maximum complexity of the gating stages employed. Using the or-and-or gating configuration of a standard DYSEAC package as described, with a maximum of 4 and-gates (in addition to the and-gate provided for regeneration) per stage and a maximum of 6 inputs for the largest and-gate, implementation of the expansion of $C_k$ can be achieved because the equation expressing $C_k$ as a function of a group of augends, addends and a previous carry can be reduced to 4 terms corresponding to 4 and-gates with no more than 6 factors in any term. Such expedient can be employed in the summation of binary numbers involving more than 4 carries in the manner now to be described. It will then be demonstrated that if $C_0$ is available during the first clock phase, $C_1$, $C_2$, $C_3$, $C_4$ can be made available during a second-clock phase, and a second group of 4 carries, $C_5$, $C_6$, $C_7$, $C_8$, can be made available during a third-clock phase. By a similar process it will be shown that within the time limits of a five-phase clock cycle, carry digits corresponding to a 53-order binary number can be efficaciously handled without exceeding the capacity of the particular standardized gating complexes employed. As has been above noted, each group of sum digits (S) can be obtained one-clock phase after the appropriate group of carries has been formed. The following description will make such operation apparent.

Writing the carry functions for the fifth, sixth, seventh, and eighth orders and using the transformation explained in connection with Equations 3–6:

$$\begin{aligned} C_5 &= A_5B_5 \\ &+(A_5+B_5)C_4 \end{aligned} \tag{7}$$

$$\begin{aligned} C_6 &= A_6B_6 \\ &+(A_6+B_6)A_5B_5 \\ &+(\qquad)(A_5+B_5)C_4 \end{aligned} \tag{8}$$

in which $C_6$ is expressed as a function of $C_4$ and is independent of $C_5$.

$$\begin{aligned} C_7 &= A_7B_7 \\ &+(A_7+B_7)A_6B_6 \\ &+(\qquad)(A_6+B_6)A_5B_5 \\ &+(\qquad)(\qquad)(A_5+B_5)C_4 \end{aligned} \tag{9}$$

in which $C_7$ is also a function of $C_4$ and is independent of both $C_5$ and $C_6$.

$$\begin{aligned} C_8 &= A_8B_8 \\ &+(A_8+B_8)A_7B_7 \\ &+(\qquad)(A_7+B_7)A_6+B_6 \\ &+(\qquad)(\qquad)(A_6+B_6)A_5B_5 \\ &+(\qquad)(\qquad)(\qquad)(A_5+B_5)C_4 \end{aligned} \tag{10}$$

in which $C_8$ is a function of $C_4$ and independent of the intermediate carries $C_5$, $C_6$, $C_7$.

By combining the first two expressions of Equation 10 as described there is obtained the form $$\begin{aligned} C_8 &= (A_8+B_8)(A_8+A_7)(A_8+B_7)(B_8+A_7))B_8+B_7) \\ &+(\qquad)(A_7+B_7)A_6B_6 \\ &+(\qquad)(\qquad)(A_6+B_6)A_5B_5 \\ &+(\qquad)(\qquad)(\qquad)(A_5+B_5)C_4 \end{aligned} \tag{10a}$$

The above equations show that the carries involved in the orders 5 to 8 can be expressed in a manner similar to the carries for the orders 1 to 4 as represented by Equations 3 to 6. Also, analogous to the fourth order carry, the eighth order carry can be reduced from the form shown by Equation 10 involving 5 and-gates to the form of Equation 10a in which only 4 and-gates are required consistent with the basic gate complex circuit components employed.

The formation of the carries consequent to a nine-order number is shown in the previously referred-to block diagram of Fig. 4. As previously described, the first 4 carries consequent to the summing of orders 1, 2, 3, 4 are generated during a second-clock phase. The third-clock phase is used to generate the carries $C_5$, $C_6$, $C_7$, $C_8$ corresponding to Equations 7, 8, 9, and 10a, consequent to the summation of the operands for the fifth, sixth, seventh, and eighth orders of the number and the final nine-order sum is obtained during the fourth-clock phase.

The carry mechanisms $402_5$, $402_6$, $402_7$, $402_8$ symbolically represented in Fig. 4, like the previously referred-to carry mechanisms $402_1$, $402_2$, $402_3$, $402_4$, are each in the form of gating complexes arranged in a manner similar to Figs. 3A and 3B to obtain the solution of Equations 7, 8, 9, and 10a, respectively defining the carries $C_5$, $C_6$, $C_7$, and $C_8$.

As previously stated, Fig. 5 is a symbolic representation of a gating complex of the standardized type employed in the SEAC and DYSEAC computer and further illustrates the logical sequences employed in obtaining an output function representing the carry digit $C_8$. Fig. 5 has been specifically arranged to indicate the implementation of a solution for Equation 10a defining the carry $C_8$. The operands of the various orders are indicated by A and B, the subscript indicating the order to which each augend A and addend B is pertinent. The input leads to each of the or-gates 501 correspond to the leads 401 shown in Fig. 4. Each or-gate 501 in Fig. 5 produces an output equal to the logical sum of the input factors applied thereto. In this manner, factors such as $(A_8+B_8)$, $(A_7+B_7)$, $(A_6+B_6)$ etc. are obtained and applied as inputs to various and-gates as is clearly apparent from Fig. 3.

Each and-gate 502 in Fig. 5 combines the inputs applied thereto to produce the logical product functions indicated in Equation 10a such as $$(A_8+B_8)(A_8+A_7)(A_8+B_7)(B_8+A_7)(B_8+B_7) \text{ etc.}$$

The final or-gate 503 shown in Fig. 5 forms the logical sum of all such products to complete Equation 10a as indicated.

There is further illustrated in Fig. 5 the timing, or sequence of generation of the various factors involved in the determination of $C_8$. The operands $A_5$, $A_6$, $A_7$, $A_8$, and $B_5$, $B_6$, $B_7$, $B_8$ as is clear from Fig. 4 are made available during clock phase 1. The lower order carry $C_4$, necessary for determining $C_8$, is generated during clock phase 2 ($CP_2$) in accordance with the sequence indicated in Fig. 4. Fig. 4 also indicates that the carry digit $C_8$ is generated during clock phase 3 and such condition is indicated in Fig. 5 by the application of the clock pulses $CP_3$ to each of the and-gates 502. Since the time difference between $CP_1$ and $CP_3$ for a five-phase, one-mc. clock pulse is ⅖ $\mu s$, delay members 504 providing a corresponding ⅕ $\mu s$ delay time are inserted between the operand inputs and the and-gates 502. Since the carry digit $C_4$ occurs during clock pulse two, no delay is necessary in that case.

Fig. 5 shows the logical circuitry in schematic form for obtaining a higher order carry such as $C_8$ which, as has been explained, can be made a function of only one lower order carry such as $C_4$ in accordance with Equation 10a independent of the intermediate order carries. It will be understood that the same logical circuitry will be employed for obtaining $C_4$ (which is a function of $C_0$) zero and the various higher order carries $C_{20}$ etc., the number of or- and and-gates employed being consonant with the number of terms in the particular equation defining the desired carry digit $C_k$.

In order to extend the above exemplified principles to a relatively large order binary number, the number of carries obtained during one clock phase must be increased without increasing the gating complexity. This is accomplished in accordance with the principles of the present invention at the expense of one clock phase and by the use of some added gating stages.

Fig. 6 is a schematic representation similar to Fig. 4, showing the carry system according to this invention extended to the thirteenth-order digit. Corresponding parts in Figs. 4 and 6, as well as Figs. 7 and 8 to be described are identified with like reference numerals. Fig. 6 illustrates how the clock phase availability between the input digits and the $C_5$ through $C_8$ carries can be utilized to form certain auxiliary carry functions to be described which enable the generation of additional carries during a third-clock phase simultaneously with $C_5$ through $C_8$. Specifically, $C_9$, $C_{10}$ etc., can be formed during the third clock phase as functions of $C_4$ if some of the terms in the expanded relations for $C_9$, $C_{10}$ etc., are combined as auxiliary carry functions in separate stages during the intervening (second) clock phase.

Writing the equation for the carry $C_9$ corresponding to the ninth order as a function of $C_4$ there is obtained:

$$\begin{aligned} C_9 = {} & A_9B_9 \\ + {} & (A_9+B_9)A_8B_8 \\ + {} & (\quad)(A_8+B_8)A_7B_7 \\ + {} & (\quad)(\quad)(A_7+B_7)A_6B_6 \\ + {} & (\quad)(\quad)(\quad)(A_6+B_6)A_5B_5 \\ + {} & (\quad)(\quad)(\quad)(\quad)(A_5+B_5)\,C_4 \end{aligned} \tag{11}$$

Equation 11 indicates a need for six and-gates whereas the discussed design considerations demands a four and-gate construction as previously stated. At this point it will be convenient to imagine a triangular outline delineating the first five lines of Eq. 11 and a rectangle delineating the last line, up to, but not including $C_4$. The purposes of such triangle-rectangle analogy is to simplify representations of and visualization of the higher order carries as the description proceeds.

Let $X_9$ represent the terms contained in the triangular portion of Eq. 11 and let $Y_9$ represent the expressions within the rectangular portion. Equation 11 can then obviously be written in simplified form as $$\begin{aligned} C_9 = {} & X_9 \\ & +Y_9C_4 \end{aligned}$$

The five terms in the triangular portions of the equation can readily be reduced to four terms by combining the first two in the manner already explained; that is, the first two lines in Eq. 11 can be developed into the form:

$$(A_9+B_9)(A_9+A_8)(A_9+B_8)(B_9+A_8)(B_9+B_8)$$

Such reduced four-term expression can then be implemented in one gating stage during a second-clock phase as will be apparent by observing the blank areas adjacent the second-clock phase portion of the Fig. 6 diagram. Moreover, the single factor enclosed within the imaginary rectangle and designated $Y_9$ can be implemented in one gating stage. $X_9$ and $Y_9$ in other words designate what can be termed auxiliary carry functions and by means of such auxiliary carry functions, $C_9$ can be formed quite easily in one gating stage during the third clock phase. Physically both $X_9$ and $Y_9$ are in fact the various terms in Eq. 11 and can readily be obtained by employing gate complexes 601, 602 of the described type. Specifically the gate complex 601 for determining $X_9$ will receive the operands $A_5$, $A_6$, $A_7$, $A_8$, $A_9$ and $B_5$, $B_6$, $B_7$, $B_8$, $B_9$ to produce an output corresponding to the triangular portion of Eq. 11 as modified for implementation by a four and-gate circuit. Similarly, the gate complex $Y_9$ which obviously need include only one and-gate having five inputs $$(A_9+B_9)(A_8+B_8)(A_7+B_7)(A_6+B_6)(A_5+B_5)$$

will provide an output corresponding to the rectangular portion of Eq. 11. Such output is applied through 603 to gate complex 402$_9$ to which the previously determined carry function $C_4$ is also applied as shown in Fig. 6. The gating complex 402$_9$ need therefore comprise only two and-gates and an or-gate to produce an output corresponding to $C_9$ in Eq. 11.

In a similar manner it can be shown that the carries $C_{10}$ through $C_{13}$ can be formed during a third clock phase of the clock timing pulse by utilizing auxiliary carry function in the manner above explained. Considering the most complex case for the arrangement of Fig. 6 which is the $C_{13}$ carry:

$$\begin{aligned} C_{13} = {} & A_{13}B_{13} \\ & +(A_{13}+B_{13})A_{12}B_{12} \\ & +(\quad)(A_{12}+B_{12})(A_{11}B_{11}) \\ & +(\quad)(\quad)(A_{11}+B_{11})(A_{10}B_{10}) \\ & +(\quad)(\quad)(\quad)(A_{10}+B_{10})X_9 \\ & +(A_{13}+B_{13})(A_{12}+B_{12})(A_{11}+B_{11})(A_{10}+B_{10})Y_9C_4 \end{aligned} \tag{12}$$

That is, $C_{13}$ is in this manner expressed as a function of the $C_4$ carry and as a function of the auxiliary carries $X_9$, $Y_9$.

Combining the first two and last two lines in the described manner, there is obtained $$\begin{aligned} C_{13} = {} & (A_{13}+B_{13})(A_{13}+A_{12})(A_{13}+B_{12})(B_{13}+A_{12})(B_{13}+B_{12}) \\ & +(A_{13}+B_{13})(A_{12}+B_{12})A_{11}B_{11} \\ & +(A_{13}+B_{13})(A_{12}+B_{12})(A_{11}+B_{11})A_{10}B_{10} \\ & +(A_{13}+B_{13})(A_{12}+B_{12})(A_{11}+B_{11})(A_{10}+B_{10})(X_9+Y_9)(X_9+C_4) \end{aligned} \tag{12a}$$

It will be apparent from Fig. 6 that the referred-to auxiliary carry functions $X_9$, $Y_9$ are made available together with the $C_1$, $C_2$, $C_3$, $C_4$ carries during the second clock phase so that $C_{13}$ can readily be determined during the third clock phase. Thus by using one pair of auxiliary carry functions it is easily posssible in accordance with the present invention to sum a fourteen-order binary number within the time limits defined by the one-$\mu s$ clock pulse interval of the computer.

It will now be demonstrated how, by employing still further auxiliary (X and Y) carry functions a twenty-one order addition can be achieved.

Specifically, writing the carry function for the fourteenth order:

$$\begin{aligned} C_{14} = {} & A_{14}B_{14} \\ + {} & (A_{14}+B_{14})A_{13}B_{13} \\ + {} & (\quad)(A_{13}+B_{13})(A_{12}B_{12}) \\ + {} & (\quad)(\quad)(A_{12}+B_{12})A_{11}B_{11} \\ + {} & (\quad)(\quad)(\quad)(A_{11}+B_{11})A_{10}B_{10} \\ + {} & (\quad)(\quad)(\quad)(\quad)(A_{10}+B_{10})\,X_9 \\ + {} & (\quad)(\quad)(\quad)(\quad)(\quad)\,Y_9C_4 \end{aligned} \tag{13a}$$

It will be noted that $C_{14}$ has been expressed as a function of the previously explained auxiliary carry functions $X_9$, $Y_9$ and of a lower order carry $C_4$. The triangular and rectangular portions of Eq. 13*a* can in turn be represented by a second auxiliary carry function $X_{14}$ and $Y_{14}$ respectively and Eq. 13*a* can therefore be written in simplified form as $$\begin{aligned} C_{14} = {} & X_{14} \\ & +Y_{14}X_9 \\ & +Y_{14}Y_9C_4 \end{aligned} \tag{13b}$$

Equation 13*b* indicates that the mechanism for obtaining a higher order carry function such as $C_{14}$ can readily be implemented on the basis of employing two pairs of auxiliary carry functions. By analogy it can be shown that similar conditions obtain for $C_{15}$, $C_{16}$ and $C_{17}$. Fig. 7 symbolically indicates the formation of both the $X_9$, $Y_9$ and $X_{14}$, $Y_{14}$ auxiliary carry functions during the second clock phase. By developing the carry functions $C_{18}$, $C_{19}$, and $C_{20}$ in a manner analogous to Eqs. 13*a* and 13*b*, it will be apparent that a third pair of auxiliary carry functions $X_{18}$, $Y_{18}$ will be involved by means of which each of the higher order carries up to $C_{20}$ can be expressed as a function of such auxiliary carry functions and of $C_4$ as shown in Fig. 7.

In this manner, by creating auxiliary carries which represent a large number of low-order carries it is possible to achieve simultaneous carry generation of higher-order carries.

The parallel adder may be extended according to the principles of this invention to accommodate 53 or more binary digits. For 53 digits, only one additional clock phase is necessary. During the fourth clock phase, the carries $C_{21}$ through $C_{52}$ can all be generated as functions of $C_{20}$ just as $C_{15}$, $C_{16}$, $C_{17}$, $C_{18}$, $C_{19}$, $C_{20}$ were expressed as functions of $C_4$ as above explained. The entire parallel array of sum digits, $S_1$–$S_{53}$ can then be formed during the (additionally provided) fifth clock phase of the computer clock pulse.

The ability to generate all of the carry digits $C_{21}$ through $C_{52}$ during the fourth clock phase of the clock pulse is based upon the fact that two clock phases are available between the time of formation of these carries and the period of application of the input digits. That is, considering Figs. 8A, 8B for the moment, which shows a 53-digit carry system according to this invention, it will be noted that the formation of the individual carries $C_{21}$–$C_{52}$ during the fourth clock phase occurs two clock phases from the time of application of the operands A and B. This permits the formation of two levels of auxiliary carry functions. The second level auxiliary carry function will be designated as Z and W, respectively to distinguish them from the first level X and Y auxiliary carry functions already described.

As in the case of the preceding carries, $C_{21}$ through $C_{32}$ are generated as functions of the appropriate augend and addend digits, some of the first-level auxiliary carry function and the carry digit $C_{20}$. Considering the most complex carry $C_{32}$, for example:

$$\begin{aligned} C_{32}= & A_{32}B_{32} \\ & +(A_{32}+B_{32})A_{31}B_{31} \\ & +(\qquad)(A_{31}+B_{31})A_{30}B_{30} \\ & +(\qquad)(\qquad)(A_{30}+A_{30})X_{29} \\ & +(\qquad)(\qquad)(\qquad)Y_{29}X_{25} \\ & +(\qquad)(\qquad)(\qquad)Y_{29}Y_{25}C_{20} \end{aligned} \tag{14a}$$

$C_{32}$ in other words is expressed as a function of some of the first-level auxiliary carry functions $X_{29}$, $Y_{29}$, $X_{25}$, $Y_{25}$ and the carry digit $C_{20}$. In order to express Eq. 14*a* in a form acceptable to the number of components in the gating complex employed, the first two and the fourth and fifth lines are combined in the manner previously described to produce the form:

$$\begin{aligned} C_{32}= & (A_{32}+B_{32})(A_{32}+A_{31})(A_{32}+B_{31})(B_{32}+A_{31})(B_{32}+B_{31}) \\ & +(\qquad)(A_{31}+B_{31})A_{30}B_{30} \\ & +(\qquad)(\qquad)(A_{30}+B_{30})(X_{29}+Y_{29})(X_{29}+X_{25}) \\ & +(\qquad)(\qquad)(\qquad)Y_{29}Y_{25}C_{20} \end{aligned} \tag{14b}$$

an expression which requires only four and-gates for implementation.

Similarly, the next higher order carry $C_{33}$ requires a third pair of carry functions $X_{33}$ and $Y_{33}$ as is apparent from Eq. 15*a* following:

$$\begin{aligned} C_{33}= & A_{33}B_{33} \\ & +(A_{33}+B_{33})A_{32}B_{32} \\ & +(\qquad)(A_{32}+B_{32})A_{31}B_{31} \\ & +(\qquad)(\qquad)(A_{31}+B_{31})A_{30}B_{30} \\ & +(\qquad)(\qquad)(\qquad)(A_{30}+B_{30})\;X_{29} \\ & +(\qquad)(\qquad)(\qquad)(\qquad)\;Y_{29}X_{25} \\ & +(\qquad)(\qquad)(\qquad)(\qquad)\;Y_{29}Y_{25}C_{20} \end{aligned} \tag{15a}$$

Representing the triangular and rectangular portion of 15*a* by the auxiliary function $X_{33}$, $Y_{33}$ there follows:

$$\begin{aligned} C_{33}= & X_{33} \\ & +Y_{33}X_{29} \\ & +Y_{33}Y_{29}X_{25} \\ & +Y_{33}Y_{29}Y_{25}\;C_{20} \end{aligned} \tag{15b}$$

which can be rewritten as $$\begin{aligned} C_{33}= & Z_{33} \\ & +W_{33}C_{20} \end{aligned} \tag{15c}$$

where $Z_{33}$ and $W_{33}$ represent the triangular and rectangular portions of Eq. 15*b* respectively.

$C_{37}$ may similarly be written as a function of the second level auxiliary carry $Z_{33}$, $W_{33}$ and $C_{20}$ as follows:

$$\begin{aligned} C_{37}= & A_{37}B_{37} \\ & +(A_{37}+B_{37})A_{36}B_{36} \\ & +(\qquad)(A_{36}+B_{36})A_{35}B_{35} \\ & +(\qquad)(\qquad)(A_{35}+B_{35})A_{34}B_{34} \\ & +(\qquad)(\qquad)(\qquad)(A_{34}+B_{34})Z_{33} \\ & +(\qquad)(\qquad)(\qquad)(\qquad)W_{33}C_{20} \end{aligned} \tag{16a}$$

Equation 16*a* is then reduced to a form requiring four and-gates:

$$\begin{aligned} C_{37}= & (A_{37}+B_{37})(A_{37}+A_{36})(A_{37}+B_{36})(B_{37}+A_{36})(B_{37}+B_{36} \\ & +(\qquad)(A_{36}+B_{36})A_{35}B_{35} \\ & +(\qquad)(\qquad)(A_{35}+B_{35})A_{34}B_{34} \\ & +(\qquad)(\qquad)(\qquad)(A_{34}+B_{34})Z_{33}+W_{33})(Z_{33}+C_{20}) \end{aligned} \tag{16b}$$

In the case of $C_{38}$ still another second-level auxiliary carry function $Z_{38}$,$W_{38}$ is developed as follows:

$$\begin{aligned} C_{38}= & A_{38}B_{38} \\ & +(A_{38}+B_{38})A_{37}B_{37} \\ & +(\qquad)(A_{37}+B_{37})A_{36}B_{36} \\ & +(\qquad)(\qquad)(A_{36}+B_{36})A_{35}B_{35} \\ & +(\qquad)(\qquad)(\qquad)(A_{35}+B_{35})A_{34}B_{34} \\ & +(\qquad)(\qquad)(\qquad)(\qquad)(A_{34}+B_{34})\;X_{33} \\ & +(\qquad)(\qquad)(\qquad)(\qquad)(\qquad)\;Y_{33}X_{29} \\ & +(\qquad)(\qquad)(\qquad)(\qquad)(\qquad)\;Y_{33}Y_{29}X_{25} \\ & +(\qquad)(\qquad)(\qquad)(\qquad)(\qquad)\;Y_{33}Y_{29}Y_{25}C_{20} \end{aligned} \tag{17a}$$

Substituting the first-level auxiliary carry function $X_{38}$, $Y_{38}$ for the triangular and rectangular portions of Eq. 17*a* there follows:

$$C_{38}=X_{38}+Y_{38}X_{33}+Y_{38}Y_{33}X_{29}+Y_{38}Y_{33}Y_{29}X_{25}+Y_{38}Y_{33}Y_{29}X_{25}C_{20} \quad (17b)$$

and further substituting an arbitrary second-level auxiliary carry function for the triangular and rectangular portions of 17*b*:

$$C_{38}=Z_{38}+W_{38}C_{20} \quad (17c)$$

For a 53-digit number it is necessary to introduce only two additional auxiliary carry functions and the last occurs in the forty-eighth order. For this order:

$$C_{48}=X_{48}+Y_{48}X_{43}+Y_{48}Y_{43}X_{38}+Y_{48}Y_{43}Y_{38}X_{33}+Y_{48}Y_{43}Y_{38}Y_{33}X_{29}+Y_{48}Y_{43}Y_{38}Y_{33}Y_{29}X_{25}+Y_{48}Y_{43}Y_{38}Y_{33}Y_{29}Y_{25}C_{20} \quad (18a)$$

Making use of the auxiliary carry function $Z_{48}$,$W_{48}$ for the triangular and rectangular portions of Eq. 18*a* there follows:

$$C_{48}=Z_{48}+W_{48}C_{20} \quad (18b)$$

That is, the carry digit $C_{48}$ is a function of the auxiliary carry function $Z_{48}$,$W_{48}$ and one lower order carry $C_{20}$.

The block diagram of Figs. 8A, 8B schematically illustrates the relationship among the various carries, and the first and second-level auxiliary carry functions. Each box in the diagram of Figs. 8A, 8B represents a gating complex of the type described in connection with Figs. 3A, 3B, and 5. It will be understood that the number of or- and and-gates employed in each box is consonant with the number of inputs and logical products to be obtained in each operation as determined by the logical equation described.

It will be noted from Figs. 8A, 8B that in addition to the four registers of gating stages required for the augend, addend, carry and sum digits, only twenty-six gating stages, equivalent to one-half of a register, are required to generate the auxiliary carry functions.

Table I (Fig. 11A) is an itemized summary of the first and second level auxiliary carry functions employed in accordance with the present invention in connection with a 53-digit parallel binary adder. The expressions for each auxiliary function can readily be correlated with the previously developed equations by substituting the equivalent value for the term $F_k$, $D_k$, and $R_k$, the latter expressions being employed to simplify the notation.

Table II contained in Figs. 11B and 11C further details the relation between the carry for each order and the auxiliary carry functions, the same equivalent terms ($F_k$, $D_k$, and $R_k$) being employed.

With the use of these tables in accordance with the principles demonstrated in the preceding description, specific gate-complex mechanisms for implementing the logical solution of the carry digits and the first and second level auxiliary carry functions pertinent to each order will be readily apparent.

The summing units 403 for determining the sum digits $S_1$ etc. shown in connection with Figs. 4, 6, 7, 8A and 8B are conventional adder mechanisms comprising a gate complex for performing the logical operation consequent to arithmetically summing operands of a particular order together with the carry or auxiliary carry function appropriate to the selected order.

Two exemplary gating complex arrangements for obtaining the sum digit $S_4$ and $S_{40}$ are shown in Figs. 9 and 10. It will be noted from Figs. 4, 6, 7, or 8A–8B that the summing unit 403$_4$ for determining $S_4$ is energized by the augend $A_4$, addend $B_4$ and the output $C_3$ of carry mechanism 402$_3$, where $C_3$ is a function of $C_0$ as will be recalled from Equation 5*b*:

$$C_3=A_3B_3+(A_3+B_3)A_2B_2+(\quad)(A_2+B_2)A_1B_1+(\quad)(\quad)(A_1+B_1)C_0 \quad (5b)$$

Equation 1, which is the general expression defining the sum digit for any order, can be written for the fourth order as follows:

$$S_4=A_4\bar{B}_4\bar{C}_3+\bar{A}_4B_4\bar{C}_3+\bar{A}_4\bar{B}_4C_3+A_4B_4C_3 \quad (1a)$$

The adder mechanism shown in Fig. 9 provides for the implementation of the operations indicated by Eq. 1*a* by means of conventional gating techniques. Since and-gates 901 in Fig. 9 are energized by a timing pulse corresponding to clock-phase four ($CP_4$) whereas the operands $A_4$, $B_4$ are made available during the first clock phase as is apparent from either Figs. 4, 6, 7, or 8, delay elements 902 are inserted as indicated. Each summing unit 403 employs the same principles of construction and operation. The number of gates are consonant with the inputs for each order and the delay elements provide delays commensurate with the difference in time between the application of each input operand and the time during which a carry digit is formulated.

Fig. 10 shows the construction of summing unit 403$_{40}$ for obtaining the solution of sum digit $S_{40}$ which is expressed as $$S_{40}=A_{40}\bar{B}_{40}\bar{C}+\bar{A}_{40}B_{40}\bar{C}_{39}+\bar{A}_{40}\bar{B}_{40}C_{39}+A_{40}B_{40}C_{39} \quad (1b)$$

The construction and mode of operation of each summing unit $S_1$–$S_{53}$ is considered to be appropriately described from the description of the above-illustrated embodiments.

It will be apparent that the principles underlying the present invention are not limited to the particular 53-digit exemplary embodiment indicated but can be extended to provide an adder mechanism for an even larger number of digits. As is also evident from the description that the design of an adder in which the number of carries needed simultaneously is less than the usable maximum, a considerable reduction in the number of gating stages needed to generate the circuitry carry functions can be achieved.

It will be apparent that the embodiments shown are only exemplary and that various modifications can be made in construction and arrangement within the scope of invention as defined in the appended claims.

What is claimed is:

1. In a digital computer having a cycle of operation defined by a plurality of sequentially occurring timing pulses, a high-speed adder for summing pulses corresponding to the augends and addends of plural-order binary-numbers under control of said timing pulses, comprising means for registering the pulses representing the respective order operand digits of said numbers including a previous carry digit $C_0$ where $C_0$ is equivalent to a carry digit which, when added to the least significant operand digits forms the least significant sum digit, means energized by one timing pulse and responsive to a first group of lower-order operand and said carry digit pulse registering means for simultaneously determining each of the respective carry digit pulses for said first group of lower-order operand pulses as a function of only the operand digit pulses in said lower-order group and of $C_0$ and independently of the intermediate order carry digits in said group, means energized in sequence by subsequent ones of said timing pulses and responsive to respective adjacent higher-order groups of said operand registering means and the highest order carry digit pulse determining means in the respective preceding group for determining each of the carry digit pulses for said higher groups of orders as a function of only the operand digit pulses in each respective higher order group and the highest order carry digit determined in the said respective preceding group and independent of the intermediate order carries in said respective higher order group, and means jointly responsive to said operand registers and carry digit determining means for summing the operand and carry digit pulses in each of said orders.

2. The invention of claim 1 in which said means for determining the highest order carry digit pulse in said first group of operands comprises an or- and-or-gate complex for logically combining the augend and addend pulses of each order and the carry pulse digit $C_0$ according to the equation:

$$\begin{aligned}C_4=&A_4B_4\\&+(A_4+B_4)A_3B_3\\&+(A_4+B_4)(A_3+B_3)A_2B_2\\&+(A_4+B_4)(A_3+B_3)(A_2+B_2)(A_1+B_1)(A_1+C_0)\\&\quad(B_1+C_0)\end{aligned}$$

where $C_4$ represents the carry function for the most significant order operand digit in said first group of operands, and $A_1$ to $A_4$, $B_1$ to $B_4$ represent the respective augends and addends of the various orders in said first group of operands.

3. The invention of claim 1 in which said means for determining the highest order carry digit pulse in a second of said groups of operands comprises an or- and-or-gate complex for logically combining the augend and addend pulse of each order in said group and the highest order carry digit pulse in said first group according to the equation:

$$\begin{aligned}C_k=&(A_k+B_k)(A_k+A_{k-1})(A_k+B_{k-1})(B_k+A_{k-1})\\&\quad(B_k+B_{k-1})\\&+(A_k+B_k)(A_{k-1}+B_{k-1})(A_{k-2}B_{k-2}\\&+(A_k+B_k)(A_{k-1}+B_{k-1})(A_{k-2}+B_{k-2})A_{k-3}B_{k-3}\\&+(A_k+B_k)(A_{k-1}+B_{k1-})(A_{k-2}+B_{k-2})(A_{k-3}\\&\quad+B_{k-3})C_{k-4}\end{aligned}$$

where $C_k$ represents the carry function for the most significant order operand digit in said second group of operands, $C_{k-4}$ represents the highest order carry pulse in said first group of carry digit pulses and $A_{k-3}$ to $A_k$, $B_{k-3}$ to $B_k$ represent the operand pulses of the intermediate orders in said second group.

4. The invention of claim 1 including means energized by said one timing pulse for determining a first level of higher-order auxiliary carry function pulses as functions of the operand pulses corresponding to the digital orders included between the digital order corresponding to said auxiliary carry function pulses and the digital order corresponding to the highest previous carry digit pulse determined during said first timing pulse and in which said means for determining some of the carry digit pulses for a next higher group of orders during a subsequent timing pulse is responsive to said first-level auxiliary carry function determining means.

5. The invention of claim 4 including means energized by said one timing pulse for determining additional first-level higher-order auxiliary carry function pulses as a function of and responsive to the operand pulses corresponding to the digital order pulses included between the digital order corresponding to said additional auxiliary carry functions and the next preceding auxiliary carry functions and additional means energized during said subsequent timing pulses and responsive to said additional first-level high-order auxiliary carry function determining means for generating several second-level auxiliary carry function pulses as a function of said additional first-level auxiliary carry functions.

6. The invention of claim 5 comprising first-level auxiliary carry functions of the form $X_k$, $Y_k$ where $$\begin{aligned}X_k=&A_k+B_k)(A_k+A_{k-1})(A_k\\&\quad+B_{k-1})(B_k+A_{k-1})(B_k+B_{k-1})\\&+(A_k+B_k)(A_{k-1}+B_{k-1})A_{k-2}B_{k-2}\\&+(A_k+B_k)(A_{k-1}+B_{k-1})(A_{k-2}+B_{k-2})A_{k-3}B_{k-3}\\&+A_k+B_k)(A_{k-1}+B_{k-1})(A_{k-2}\\&\quad+B_{k-2})(A_{k-3}+B_{k-3})A_{k-4}B_{k-4}\end{aligned}$$

and $$\begin{aligned}Y_k=&(A_k+B_k)(A_{k-1}+B_{k-1})(A_{k-2}\\&\quad+B_{k-2})(A_{k-3}+B_{k-3})(A_{k-4}+B_{k-4})\end{aligned}$$

where $A_{k-4}$ to $A_k$ and $B_{k-4}$ to $B_k$ represent the operand pulses corresponding to said defined digital orders and in which said auxiliary carry function determining means comprises an or-and-or-gate complex responsive to said one timing pulse and said operand storing means for logically combining said respective enumerated functions $X_k$ and $Y_k$.

7. The invention of claim 5 comprising first-level auxiliary carry functions of the form $X_k$, $Y_k$ where $$\begin{aligned}X_k=&A_kB_k\\&+(A_k+B_k)A_{k-1}B_{k-1}\\&+(A_k+B_k)(A_{k-1}+B_{k-1})A_{k-2}B_{k-2}\\&+(A_k+B_k)(A_{k-1}+B_{k-1})(A_{k-2}+B_{k-2})A_{k-3}B_{k-3}\end{aligned}$$

and $$Y_k=(A_k+B_k)(A_{k-1}+B_{k-1})(A_{k-2}+B_{k-2})(A_{k-3}+B_{k-3})$$

where $A_{k-3}$ to $A_k$ and $B_{k-3}$ to $B_k$ represent the operand pulses corresponding to said defined digital orders and in which said first-level auxiliary carry functions determining means comprises an or-and-or-gate complex responsive to said one timing pulse and said operand storing means for logically combining said respective enumerated functions $X_k$ and $Y_k$.

8. The invention of claim 6 comprising second-level auxiliary carry functions of the form $Z_k$, $W_k$ where $$Z_k=X_k+Y_kX_{k-4}+Y_kY_{k-4}X_{k-8}$$

and $$W_k=Y_kY_{k-4}Y_{k-8}$$

and $X_k$ and $Y_k$ correspond to said first-level auxiliary carry functions of respective order and in which said defined second-level auxiliary carry functions generating means comprises an or-and-or-gate complex responsive to said subsequent timing pulses and said first-level auxiliary carry function generating means for logically combining said respective enumerated functions $X_k$ and $Y_k$.

9. The invention of claim 6 comprising second-level auxiliary carry function of the form $Z_k$, $W_k$ where $$\begin{aligned}Z_k=&X_k\\&+Y_kX_{k-5}\\&+Y_kY_{k-5}X_{k-9}\\&+Y_kY_{k-5}Y_{k-9}X_{k-13}\end{aligned}$$

and where $$W_k=Y_kY_{k-5}Y_{k-9}Y_{k-13}$$

where $X_k$ and $Y_k$ correspond to said first-level auxiliary carry functions and in which said defined second-level auxiliary carry function generating means comprises an or-and-or-gate complex responsive to said subsequent timing pulses and said first-level auxiliary carry function generating means for logically combining said respective enumerated functions $X_k$ and $Y_k$.

10. The invention of claim 6 comprising second-level auxiliary carry function of the form $Z_k$, $W_k$ where $$Z_k = X_k + Y_k X_{k-5} + Y_k Y_{k-5} X_{k-10} + Y_k Y_{k-5} Y_{k-10} (X_{k-14} + Y_{k-14})(X_{k-14} + X_{k-18})$$

and where $$W_k = Y_k Y_{k-5} Y_{k-10} Y_{k-14} Y_{k-18}$$

where $X_k$ and $Y_k$ correspond to said first-level auxiliary carry functions and in which said defined second-level auxiliary carry function generating means comprises and or-and-or-gate complex for logically combining said respective enumerated function $X_k$ and $Y_k$.

11. The invention of claim 6 comprising second-level auxiliary carry function of the form $Z_k$, $W_k$ where $$Z_k = X_k + Y_k X_{k-5} + Y_k Y_{k-5} (X_{k-10} + Y_{k-10})(X_{k-10} + X_{k-15}) + Y_k Y_{k-5} Y_{k-10} Y_{k-15} (X_{k-19} + Y_{k-19})(X_{k-19} + X_{k-23})$$

and where $$W_k = Y_k Y_{k-5} Y_{k-10} Y_{k-15} Y_{k-19} Y_{k-23}$$

where $X_k$ and $Y_k$ correspond to said first-level auxiliary carry functions and in which said defined second-level auxiliary carry function generating means comprises an or-and-or-gate complex responsive to said subsequent timing pulses and said first-level auxiliary function generating means for logically combining said respective enumerated functions $X_k$ and $Y_k$.

12. The invention of claim 5 in which said carry and auxiliary carry function determining means comprise or-and-or-gate complexes, all of which can be identical, having a fixed, predetermined number of and-gates and a predetermined number of inputs thereto and in which the number of carry and auxiliary carry function generating means is a function of the maximum number of and-gates in each gate complex.

13. In a digital computer having a cycle of operation defined by a plurality of sequentially occurring timing pulses from a timing pulse source, a high-speed adder for summing plural-order binary numbers represented as operand pulses under control of said timing pulses comprising register means connected to said timing pulse source for storing the respective order operand digit pulses representing said numbers, groups of carry digit pulse generating means associated with different respective groups of said register means, means connected to said timing pulse source responsive to said timing pulses for energizing each group of said respective carry digit generating means in sequence, the carry digit generating means in each group being connected to corresponding ones of said order operand registering means, and means connecting the highest order carry digit generating means in a lower-order group to each of the carry digit generating means in the adjacent higher order group.

14. The invention of claim 13 including auxiliary carry function generating means connected to higher order operand digit registers in said storing means, means connected to said timing pulse source for energizing said auxiliary carry function generating means concurrently with a preceding group of said carry digit generating means and means connecting said auxiliary carry function generating means to a group of said carry digit generating means energized during a subsequent time period.

References Cited in the file of this patent

UNITED STATES PATENTS

| | | |
|---|---|---|
| 2,700,504 | Thomas | Jan. 25, 1955 |
| 2,734,684 | Ross | Feb. 14, 1956 |
| 2,803,401 | Nelson | Aug. 20, 1957 |

FOREIGN PATENTS

| | | |
|---|---|---|
| 750,475 | Great Britain | June 13, 1956 |
| 481,079 | Italy | May 19, 1953 |